(12) United States Patent
Fujishiro et al.

(10) Patent No.: US 10,880,796 B2
(45) Date of Patent: *Dec. 29, 2020

(54) USER TERMINAL

(71) Applicant: KYOCERA CORPORATION, Kyoto (JP)

(72) Inventors: Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 73 days.

This patent is subject to a terminal disclaimer.

(21) Appl. No.: 15/876,649

(22) Filed: Jan. 22, 2018

(65) Prior Publication Data

US 2018/0146401 A1    May 24, 2018

Related U.S. Application Data

(63) Continuation of application No. 15/223,618, filed on Jul. 29, 2016, now Pat. No. 9,877,241, which is a
(Continued)

(51) Int. Cl.
*H04W 36/00* (2009.01)
*H04W 48/18* (2009.01)
(Continued)

(52) U.S. Cl.
CPC ....... *H04W 36/0083* (2013.01); *H04W 36/14* (2013.01); *H04W 48/18* (2013.01); *H04W 8/005* (2013.01)

(58) Field of Classification Search
CPC .. H04W 36/0083; H04W 36/14; H04W 48/18
See application file for complete search history.

(56) References Cited

U.S. PATENT DOCUMENTS

2013/0109301 A1    5/2013 Hakola et al.
2013/0288668 A1    10/2013 Pragada et al.
(Continued)

FOREIGN PATENT DOCUMENTS

JP    2013-223192 A    10/2013
JP    2016-32252 A    3/2016
(Continued)

OTHER PUBLICATIONS

International Search Report issued in PCT/JP2015/081365; dated Jan. 26, 2016.
(Continued)

*Primary Examiner* — Redentor Pasia
(74) *Attorney, Agent, or Firm* — Studebaker & Brackett PC

(57) ABSTRACT

A user terminal, user terminal chipset, and method performed at a user terminal receives a system information block (SIB) from a base station. The SIB includes information indicating a resource pool to be used for device-to-device (D2D) discovery in a cell of the base station, a frequency list indicating frequencies different from a frequency of the cell and available for the D2D discovery, and usage identification information associated with frequency identifiers in the frequency list and indicating whether to be available for public safety (PS). Determination is made, based on whether the user terminal satisfies a predetermined condition, of one of the D2D discovery for the PS and the D2D discovery for the non-PS, a frequency available for the PS is selected based on the usage identification information when the user terminal performs the D2D discovery for the PS, and the selected frequency is used to perform the D2D discovery.

4 Claims, 14 Drawing Sheets

Related U.S. Application Data continuation of application No. PCT/JP2015/081365, filed on Nov. 6, 2015.

(60) Provisional application No. 62/076,734, filed on Nov. 7, 2014.

(51) Int. Cl.
*H04W 36/14* (2009.01)
*H04W 8/00* (2009.01)

(56) References Cited

U.S. PATENT DOCUMENTS

| | | | |
|---|---|---|---|
| 2013/0315079 | A1 | 11/2013 | Edge |
| 2013/0324114 | A1 | 12/2013 | Raghothaman et al. |
| 2014/0056220 | A1 | 2/2014 | Poitau et al. |
| 2015/0043448 | A1* | 2/2015 | Chatterjee ............. H04W 8/005 370/329 |
| 2015/0087283 | A1 | 3/2015 | Isobe et al. |
| 2015/0201392 | A1 | 7/2015 | Sartori et al. |
| 2015/0215767 | A1* | 7/2015 | Siomina ................. H04W 8/02 455/435.2 |
| 2015/0215903 | A1* | 7/2015 | Zhao ...................... H04W 72/04 370/329 |
| 2015/0215982 | A1* | 7/2015 | Siomina ................ H04W 76/14 370/328 |
| 2015/0257184 | A1 | 9/2015 | Yamazaki et al. |
| 2015/0271720 | A1 | 9/2015 | Yamada et al. |
| 2015/0327311 | A1* | 11/2015 | Wei ...................... H04L 12/6418 370/329 |
| 2015/0327312 | A1 | 11/2015 | Burbidge et al. |
| 2016/0044552 | A1* | 2/2016 | Heo ........................ H04L 5/001 370/331 |
| 2016/0135239 | A1* | 5/2016 | Khoryaev ............. H04W 76/14 370/329 |
| 2016/0269953 | A1* | 9/2016 | Jung ...................... H04W 36/08 |
| 2016/0353416 | A1 | 12/2016 | Takano |
| 2017/0078863 | A1* | 3/2017 | Kim ...................... H04W 48/16 |
| 2017/0222861 | A1* | 8/2017 | Jung ........................ H04W 4/70 |
| 2017/0245244 | A1* | 8/2017 | Jung ..................... H04W 72/02 |
| 2017/0303297 | A1* | 10/2017 | Lee ...................... H04W 72/005 |

FOREIGN PATENT DOCUMENTS

| | | |
|---|---|---|
| WO | 2013/055271 A1 | 4/2013 |
| WO | 2014/046578 A1 | 3/2014 |
| WO | 2014/050556 A1 | 4/2014 |
| WO | 2016/017621 A1 | 2/2016 |

OTHER PUBLICATIONS

Written Opinion issued in PCT/JP2015/081365; dated Jan. 26, 2016.

3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.

LG Electronics Inc.; Prioritized reselection of D2D supported frequency; 3GPP TSG-RAN WG2 #87; R2-143740; Aug. 18-22, 2014; pp. 1-3; Dresden, Germany.

SA WG1; Reply LS on availability of ProSe Direct Communication in limited service state; SA WG2 Meeting #S2-105; S2-142965; Oct. 13-17, 2014; pp. 1-5; Sapporo, Japan.

An Office Action; "Notice of Reasons for Rejection," issued by the Japanese Patent Office dated Sep. 13, 2016, which corresponds to Japanese Patent Application No. 2016-549410 and is related to U.S. Appl. No. 15/223,618; with English language statement of relevance.

An Office Action issued by the Japanese Patent Office dated Feb. 7, 2017, which corresponds to Japanese Patent Application No. 2016-200651 with English language statement of relevance; 5pp.

Qualcomm Incorporated; "Signaling Details for ProSe Direct Discovery"; 3GPP TSG-RAN WG2 #86; R2-142540; May 19-23, 2014; Seoul, South Korea; 7pp.

Kyocera; "Inter-frequency discovery considerations"; 3GPP TSG-RAN WG2 #86; R2-142240; May 19-23, 2014; Seoul, South Korea; 10pp.

An Office Action issued by the Japanese Patent Office dated Jun. 13, 2017, which corresponds to Japanese Patent Application No. 2016-200651; with English language concise explanation; 4pp.

Communication pursuant to Rule 164(1) EPC issued by the European Patent Office dated Feb. 13, 2018, which corresponds to European Patent Application No. 15856266.0-1214 and is related to U.S. Appl. No. 15/876,649.

ETSI MCC.; Draft Report of 3GPP TSG RAN WG2 meeting #87bis; R2-14xxxx; Nov. 16-20, 2014; pp. 1-122; San Francisco, USA.

Samsung; "Idle mode procedure to support inter-ProSe carrier"; 3GPP TSG-RAN WG2 #87bis; R2-144304; Oct. 6-10, 2014; total 3 pages; Shanghai, China.

Qualcomm Incorporated et al.; "Introduction of ProSe"; 3GPP TSG-RAN WG2 #87bis; R2-144542; Oct. 6-10, 2014; total 21 pages; Shanghai, China.

\* cited by examiner

USER TERMINAL

CROSS REFERENCE TO RELATED APPLICATION

This application is a Continuation Application of U.S. patent application Ser. No. 15/223,618 filed on Jul. 29, 2016, which is Continuation Application of International Patent Application No. PCT/JP2015/081365 filed on Nov. 6, 2015, which claims the benefit of U.S. Provisional Application No. 62/076,734 filed on Nov. 7, 2014, the entire contents of which are incorporated herein by reference.

FIELD

The present disclosure relates to a user terminal and a base station used in a mobile communication system that supports a D2D proximity service.

BACKGROUND

The 3GPP (3rd Generation Partnership Project), which is a project aiming to standardize a mobile communication system, is considering to introduce a Device to Device (D2D) proximity service as a new function in Release 12 and later (see Non Patent Literature 1).

The D2D proximity service (D2D ProSe) is a service enabling direct device-to-device communication within a synchronization cluster formed by a plurality of synchronized user terminals. The D2D proximity service includes: a D2D discovery procedure (ProSe Discovery) in which a proximal terminal is discovered; and D2D communication (ProSe Communication) that is direct device-to-device communication.

PRIOR ART DOCUMENT

Non-Patent Document

Non Patent Document 1: 3GPP technical report "TR 36.843 V12.0.1" Mar. 27, 2014

SUMMARY

This disclosure provides a user terminal comprising a controller. The controller is configured to execute a process of receiving a system information block from a base station. The system information block includes information indicating a resource pool to be used for device-to-device (D2D) discovery in a cell of the base station, a frequency list indicating frequencies different from a frequency of the cell and available for the D2D discovery, and usage identification information associated with frequency identifiers in the frequency list and indicating whether to be available for public safety. The controller is configured to execute processes of determining, based on whether the user terminal satisfies a predetermined condition, one of the D2D discovery for the public safety and the D2D discovery for the non-public safety, selecting a frequency available for the public safety based on the usage identification information when the user terminal performs the D2D discovery for the public safety, and using the selected frequency to perform the D2D discovery.

This disclosure also provides a chipset for a user terminal comprising a processor configured to execute a process of receiving a system information block from a base station. The system information block includes information indicating a resource pool to be used for device-to-device (D2D) discovery in a cell of the base station, a frequency list indicating frequencies different from a frequency of the cell and available for the D2D discovery, and usage identification information associated with frequency identifiers in the frequency list and indicating whether to be available for public safety. The processor is configured to execute processes of determining, based on whether the user terminal satisfies a predetermined condition, one of the D2D discovery for the public safety and the D2D discovery for the non-public safety, selecting a frequency available for the public safety based on the usage identification information when the user terminal performs the D2D discovery for the public safety, and using the selected frequency to perform the D2D discovery.

This disclosure also provides a method performed at a user terminal, the method comprising receiving a system information block from a base station. The system information block includes information indicating a resource pool to be used for device-to-device (D2D) discovery in a cell of the base station, a frequency list indicating frequencies different from a frequency of the cell and available for the D2D discovery, and usage identification information associated with frequency identifiers in the frequency list and indicating whether to be available for public safety. The method comprises determining, based on whether the user terminal satisfies a predetermined condition, one of the D2D discovery for the public safety and the D2D discovery for the non-public safety, selecting a frequency available for the public safety based on the usage identification information when the user terminal performs the D2D discovery for the public safety, and using the selected frequency to perform the D2D discovery.

DESCRIPTION OF EMBODIMENTS

Overview of Embodiment

Figure 1:
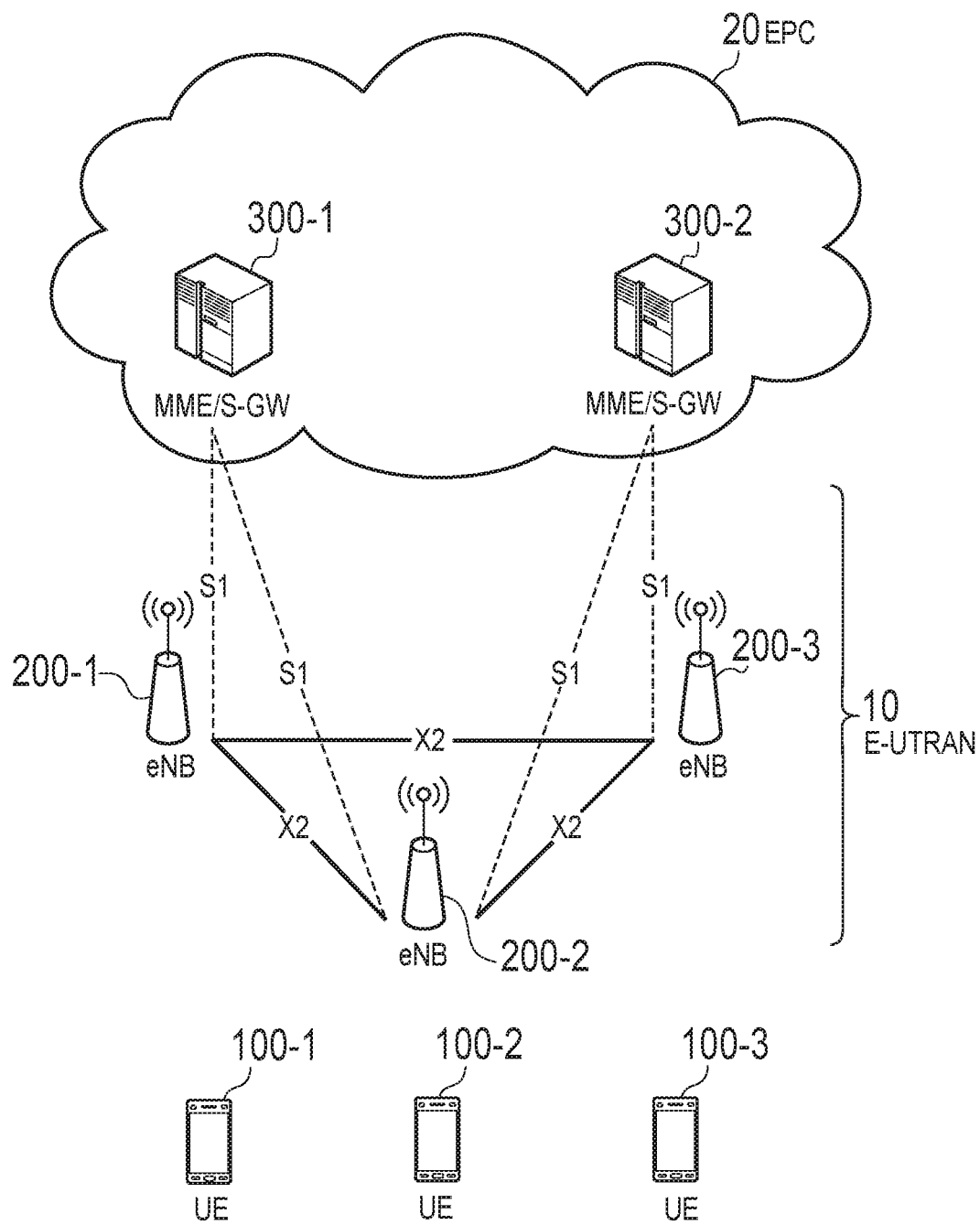
FIG. 1 is a configuration diagram of an LTE system according to a first embodiment to a sixth embodiment.

The user terminal performs a cell selection and/or a cell reselection in which an appropriate cell is selected as a serving cell (standby target cell) in an idle mode.

In the current specification of the cell selection and/or and the cell reselection, the user terminal selects an appropriate cell irrespective of whether the user terminal has an interest in the D2D proximity service.

However, the frequency and the PLMN (Public Land Mobile Network) available for the D2D proximity service may be limited, and thus, it is desired to realize the cell selection and the cell reselection optimized for the D2D proximity service.

Therefore, the embodiment provides a user terminal and a base station with which it is possible to realize a cell selection and/or a cell reselection optimized for a D2D proximity service.

A user terminal according to a first embodiment comprises: a receiver configured to receive, from a base station, configuration information for specifying either one of a first selection rule or a second selection rule, as a selection rule applied to a cell selection and/or a cell reselection in an idle mode; and a controller configured to perform, in the idle mode, the cell selection and/or the cell reselection in accordance with the selection rule specified by the configuration information. The first selection rule is a selection rule for selecting an appropriate cell irrespective of whether the user terminal has an interest in the D2D proximity service. The second selection rule is a selection rule for preferentially selecting, as the appropriate cell, a cell belonging to a frequency available for the D2D proximity service, in case that the user terminal has the interest in the D2D proximity service.

In the first embodiment, the receiver receives, from the base station, a list of frequencies available for the D2D proximity service. Each frequency available for the D2D proximity service is associated with a priority in the second selection rule in the list.

The base station according to the first embodiment comprises a transmitter configured to transmit, to a user terminal, configuration information for specifying either one of a first selection rule or a second selection rule, as a selection rule applied to a cell selection and/or a cell reselection in an idle mode. The first selection rule is a selection rule for selecting an appropriate cell irrespective of whether the user terminal has an interest in a D2D proximity service. The second selection rule is a selection rule for preferentially selecting, as the appropriate cell, a cell belonging to a frequency available for the D2D proximity service, in case that the user terminal has the interest in the D2D proximity service.

In the first embodiment, the transmitter transmits, to the user terminal, a list of frequencies available for the D2D proximity service. Each frequency available for the D2D proximity service is associated with a priority in the second selection rule in the list.

A user terminal according to a second embodiment is provided with a removable storage medium configured to store therein subscriber information. The user terminal comprises a controller configured to control a cell selection and/or a cell reselection in an idle mode. The removable storage medium stores therein a preconfigured frequency as a frequency available for a D2D proximity service. The controller sets, as a frequency of the highest priority, the preconfigured frequency in the cell selection and/or the cell reselection, in case that the user terminal has, in the idle mode, an interest in the D2D proximity service.

In the second embodiment, in case that the user terminal has an interest in the D2D proximity service, the controller selects the preconfigured frequency in order to perform the D2D proximity service, even in case that the appropriate cell belonging to the preconfigured frequency is not discovered in the cell selection and/or the cell reselection.

A user terminal according to a third embodiment is provided with a removable storage medium configured to store therein subscriber information. The user terminal comprises a controller configured to include: an NAS entity configured to perform a PLMN selection in an idle mode; and an AS entity configured to perform a cell selection and/or a cell reselection in the idle mode. The removable storage medium stores therein a preconfigured frequency as a frequency available for a D2D proximity service. The AS entity notifies the NAS entity of a specific PLMN discovered in the preconfigured frequency. The NAS entity detaches, in case that the specific PLMN is different from a currently selected PLMN, from the currently selected PLMN and selects the specific PLMN.

In the third embodiment, the AS entity stores the specific PLMN until receiving a PLMN search instruction from the NAS entity. The AS entity notifies the NAS entity of the specific PLMN, in case that receiving the PLMN search instruction from the NAS entity.

A user terminal according to a fourth embodiment comprises a controller configured to transmit, in case that the user terminal has, in a connected mode, an interest in a D2D proximity service and a serving cell is a cell available for the D2D proximity service, a D2D interest notification to the serving cell. The controller releases an RRC connection with the serving cell, in case that the user terminal has, in the connected mode, an interest in the D2D proximity service and the serving cell is a cell not available for the D2D proximity service.

In the fourth embodiment, the controller comprises an NAS entity and an AS entity. The AS entity releases the RRC connection, in case that the user terminal has, in the connected mode, an interest in the D2D proximity service and the serving cell is a cell not available for the D2D proximity service, and notifies the NAS entity of the release of the RRC connection.

In the fourth embodiment, the controller comprises an NAS entity and an AS entity. The AS entity requests to the NAS entity a process for releasing the RRC connection, in case that the user terminal has, in the connected mode, an interest in the D2D proximity service and the serving cell is a cell not available for the D2D proximity service.

A user terminal according to a fifth embodiment supports a D2D discovery procedure and a D2D proximity service including D2D communication. The user terminal comprises a controller configured to control a cell selection and/or a cell reselection in an idle mode. In case of having an interest, in the idle mode, in both the D2D discovery procedure and the D2D communication, the controller sets, in the cell selection and/or the cell reselection, a frequency available both for the D2D discovery procedure and the D2D communication, as a frequency of the highest priority.

In the fifth embodiment, in case of having an interest, in the idle mode, in both the D2D discovery procedure and the D2D communication, and there is no frequency available for both the D2D discovery procedure and the D2D communication, the controller sets, in accordance with the priority order, either one of a frequency available for the D2D discovery procedure or a frequency available for the D2D communication, as a frequency of the highest priority. The priority order is based on a measurement value of a cell-specific reference signal or an instruction from an NAS entity to an AS entity.

A user terminal according to a sixth embodiment comprises a controller configured to set, from among a plurality of frequencies available for the D2D proximity service, a frequency prioritized in a cell selection and/or a cell reselection, in case that the user terminal has, in an idle mode, an interest in a D2D proximity service. Each of the plurality of frequencies includes a D2D radio resource available for the D2D proximity service. The controller compares an amount of the D2D radio resource of each of the plurality of frequencies to set the frequency prioritized in the cell selection and/or the cell reselection.

First Embodiment

An embodiment in which the present disclosure is applied to an LTE system will be described, below.

(System Configuration)

A configuration of an LTE system according to a first embodiment will be described below. FIG. 1 is a configuration diagram of the LTE system according to the first embodiment. As illustrated in FIG. 1, the LTE system according to the first embodiment comprises a UE (User Equipment) 100, an E-UTRAN (Evolved-UMTS Terrestrial Radio Access Network) 10, and an EPC (Evolved Packet Core) 20.

The UE 100 corresponds to a user terminal. The UE 100 is a mobile communication apparatus, which performs radio communication with a cell (serving cell) with which connection is established. The configuration of the UE 100 will be described later.

The E-UTRAN 10 corresponds to a radio access network. The E-UTRAN 10 comprises an eNB 200 (evolved Node-B). The eNB 200 corresponds to a base station. The eNB 200 is connected mutually via an X2 interface. The configuration of the eNB 200 will be described later.

The eNB 200 manages one or a plurality of cells, and performs radio communication with the UE 100 which establishes a connection with a cell of the eNB 200. The eNB 200 has a radio resource management (RRM) function, a routing function of user data, a measurement control function for mobility control and scheduling, and the like. The "cell" is used as a term indicating a smallest unit of a radio communication area, and is also used as a term indicating a function of performing radio communication with the UE 100.

The EPC 20 corresponds to a core network. A network of the LTE system is configured by the E-UTRAN 10 and the EPC 20. The EPC 20 comprises an MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface.

Figure 2:
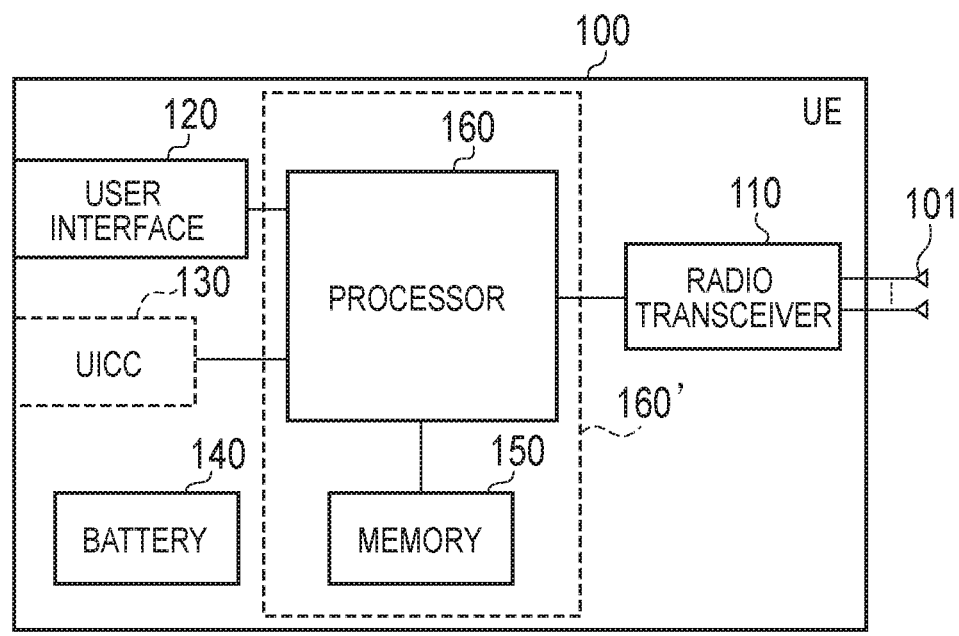
FIG. 2 is a block diagram of a UE (user terminal) according to the first embodiment to the sixth embodiment.

FIG. 2 is a block diagram of the UE 100. As illustrated in FIG. 2, the UE 100 comprises an antenna 101, a radio transceiver 110, a user interface 120, a UICC (Universal Integrated Circuit Card) 130, a battery 140, a memory 150, and a processor 160. The memory 150 corresponds to a storage unit and the processor 160 corresponds to a controller. The UE 100 may not necessarily have the GNSS receiver unit 130. Furthermore, the memory 150 may be integrally formed with the processor 160, and this set (in other words, a chip set) may be used as a processor 160' forming a controller.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (reception signal), and outputs the baseband signal to the processor 160. The radio transceiver 110 and the processor 160 configure a transmitter and a receiver.

The radio transceiver 110 may comprise a plurality of transmitter units and/or a plurality of receiver units. In the first embodiment, a case is mainly assumed where the radio transceiver 110 comprises one transmitter unit and one receiver unit only.

The user interface 120 is an interface with a user carrying the UE 100, and comprises, for example, a display, a microphone, a speaker, and various buttons. The user interface 120 receives an operation from a user and outputs a signal indicating the content of the operation to the processor 160.

The UICC 130 is a removable storage medium that stores therein subscriber information. The UICC 130 may be called SIM (Subscriber Identity Module) or USIM (Universal SIM).

The battery 140 accumulates power to be supplied to each block of the UE 100. In case that the UE 100 is a card-type terminal, the UE 100 may not comprise the user interface 120 nor the battery 140.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various types of processes and various types of communication protocols described later.

Figure 3:
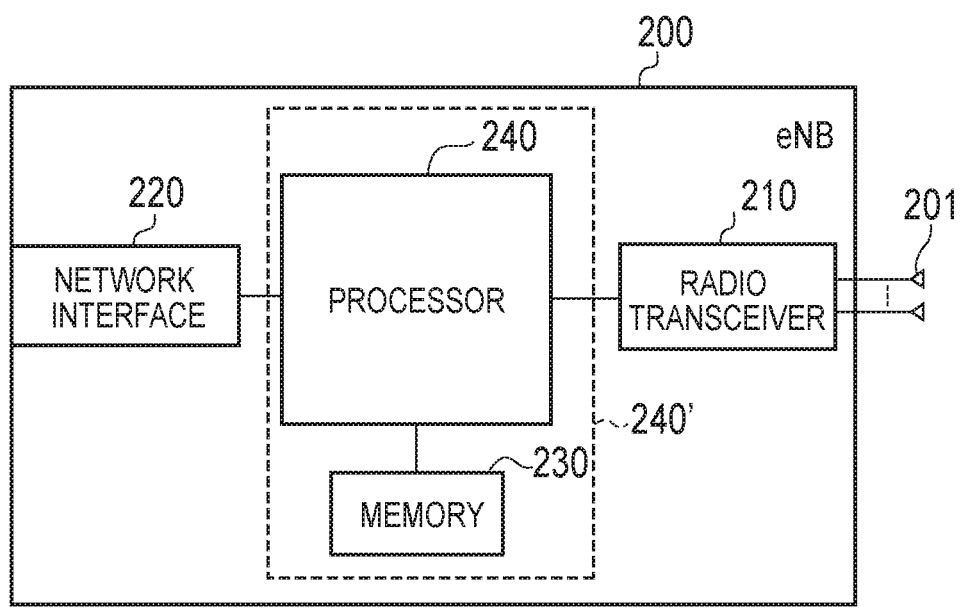
FIG. 3 is a block diagram of an eNB (base station) according to the first embodiment and the sixth embodiment.

FIG. 3 is a block diagram of the eNB 200. As illustrated in FIG. 3, the eNB 200 comprises an antenna 201, a radio transceiver 210, a network interface 220, a memory 230, and a processor 240. In the present embodiment, the memory 230 corresponds to a storage unit and the processor 240 corresponds to a controller. It is noted that the memory 230 is integrated with the processor 240, and this set (in other words, a chipset) may be used as a processor 240' forming a controller.

The antenna 201 and the radio transceiver 210 are used to transmit and receive the radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (reception signal), and outputs the baseband signal to the processor 240. The radio transceiver 210 and the processor 240 configure a transmitter and a receiver.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
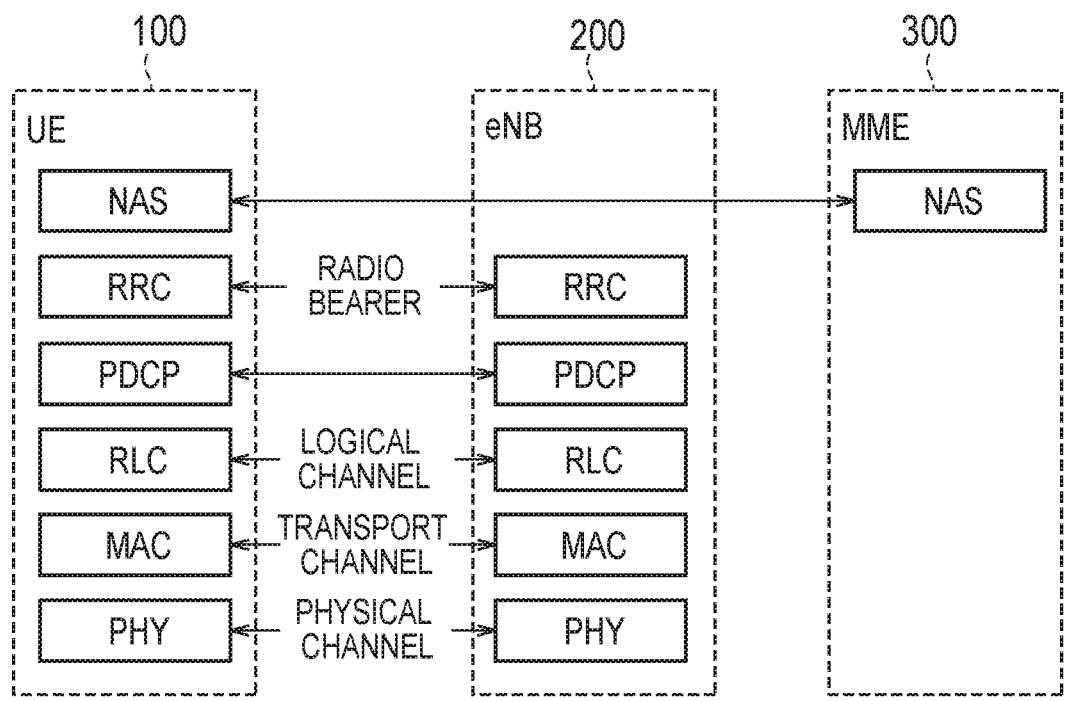
FIG. 4 is a protocol stack diagram of a radio interface in an LTE system.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, user data and control signals are sent via a physical channel.

The MAC layer performs priority control of data, and a retransmission process and the like by a hybrid ARQ (HARQ). Between the MAC layer of the UE 100 and the MAC layer of the eNB 200, user data and control signals are sent via a transport channel. The MAC layer of the eNB 200 includes a scheduler for determining (scheduling) a transport format (a transport block size and a modulation and coding scheme) of an uplink and a downlink, and a resource block to be allocated to the UE 100.

The RLC layer sends data to an RLC layer of a reception side by using the functions of the MAC layer and the physical layer. Between the RLC layer of the UE 100 and the RLC layer of the eNB 200, user data and control signals are sent via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (RRC message) for various types of configurations is sent. The RRC layer controls a logical channel, a transport channel, and a physical channel depending on the establishment, re-establishment, and release of a radio bearer. In case that there is a connection (an RRC connection) between the RRC of the UE 100 and the RRC of the eNB 200, the UE 100 is in an RRC connected mode. Otherwise, the UE 100 is in an RRC idle mode.

An NAS (Non-Access Stratum) layer positioned above the RRC layer performs session management, mobility management, and the like.

In the UE 100, the physical layer to the RRC layer configure an AS (Access Stratum) entity 100A. The NAS layer configures an NAS entity 100B. Functions of the AS entity 100A and the NAS entity 100B are executed by the processor 160 (controller). In other words, the processor 160 (controller) includes the AS entity 100A and the NAS entity 100B. In the idle mode, the AS entity 100A performs the cell selection/reselection, and the NAS entity 100B performs the PLMN selection.

Figure 5:
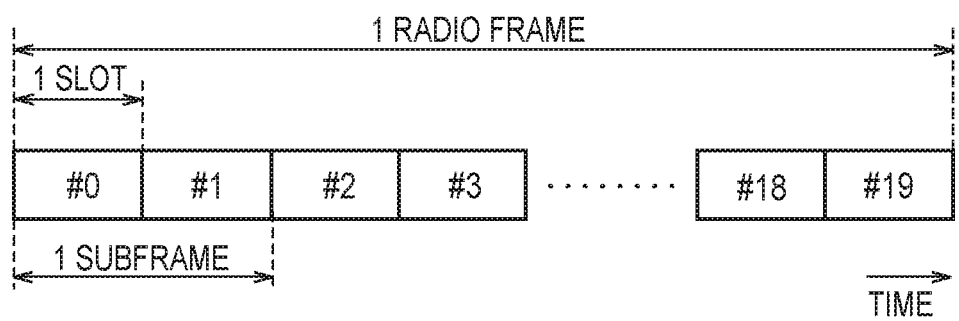
FIG. 5 is a configuration diagram of a radio frame used in the LTE system.

FIG. 5 is a configuration diagram of a radio frame used in the LTE system. In the LTE system, OFDMA (Orthogonal Frequency Division Multiple Access) is applied to a downlink (DL), and SC-FDMA (Single Carrier Frequency Division Multiple Access) is applied to an uplink (UL), respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is configured by one subcarrier and one symbol. Of the radio resources allocated to the UE 100, a frequency resource is configured by a resource block, and a time resource is configured by a subframe (or a slot).

(Basic Operation of Cell Selection/Reselection)

A basic operation of the cell selection and/or the cell reselection (cell selection/reselection) will be described, below. The AS entity 100A of the UE 100 performs the cell selection/reselection in which an appropriate cell is selected as a serving cell (standby target cell) in the idle mode. The UE 100 performs the cell selection/reselection in the idle mode.

In the cell selection/reselection in the LTE, a concept, which is called "best cell principle", of selecting a cell with the highest received power is adopted. Furthermore, in the LTE, during cell search, a frequency with a high priority is constantly set as a frequency to be measured, and the higher the priority, the less strict the cell movement condition, whereby it is possible to achieve a state in which it is easy to select the frequency with a higher priority.

Further, in the LTE, the priority is provided for each frequency, and the priority is taken into consideration during a peripheral cell measurement and during a cell reselection evaluation. The correspondence relationship between the frequency and the priority is notified within system information from the eNB 200. It is assumed below the correspondence relationship between the frequency and the priority is notified by an SIB 5 (System information Block type 5).

For example, as a selection rule applied to the cell selection/reselection in the idle mode, the AS entity 100A of the UE 100 applies a general selection rule (first selection rule).

a) When a frequency priority of a cell subject to reselection evaluation>a frequency priority of a cell in which to exist, if a received power of the evaluated cell is continuously higher than a threshold value for a certain time period, then movement is made to the evaluated cell.

b) When a frequency priority of a cell subject to reselection evaluation=a frequency priority of a cell in which to exist, the cell is ranked on the basis of the received power and if the rank of the evaluated cell is continuously in a higher state for a certain time period than the rank of the cell in which to exist, then the movement is made to the evaluated cell.

c) When a frequency priority of a cell subject to a reselection evaluation<a frequency priority of a cell in which to exist, if the received power of the cell in which to exist is lower than a threshold value and the received power of the evaluated cell is continuously in a higher state for a certain time period than another threshold value, the movement is made the evaluated cell.

It is noted that a normal selection rule (first selection rule) is to select an appropriate cell irrespective of whether the UE 100 has an interest in the D2D proximity service. The UE 100 having the interest in the D2D proximity service means a state where the UE 100 decides to start the use of the D2D proximity service but has not started the use, or a state where the UE 100 has already used the D2D proximity service.

(Overview of D2D Discovery Procedure)

As to the D2D proximity service according to the first embodiment, the D2D discovery procedure will be mainly described, below. The LTE system according to the embodiment supports the D2D proximity service.

The D2D proximity service (D2D ProSe) is a service enabling direct UE-to-UE communication within a synchronization cluster including a plurality of synchronized UEs 100. The D2D proximity service includes: a D2D discovery procedure (ProSe Discovery) in which a proximal UE is discovered; and D2D communication (ProSe Communication) that is direct UE-to-UE communication.

A scenario in which all the UEs 100 forming the synchronization cluster are located in a cell coverage is called "In coverage". A scenario in which all the UEs 100 forming the synchronization cluster are located out of a cell coverage is called "Out of coverage". A scenario in which some UEs 100 in the synchronization cluster are located in a cell coverage and the remaining UEs 100 are located out of the cell coverage is called "Partial coverage".

Currently, it is assumed that the D2D discovery procedure is performed only in In coverage. A case is mainly assumed, below, where the D2D discovery procedure is performed in In coverage.

It is noted that in the D2D discovery procedure, the UE 100 transmits a D2D discovery signal (Discovery signal) for discovering a proximal terminal. Schemes of the D2D discovery procedure include: a first scheme (Type 1 discovery) in which a radio resource not uniquely allocated to the UE 100 is used for transmitting the D2D discovery signal; and a second scheme (Type 2 discovery) in which a radio resource uniquely allocated to each UE 100 is used for transmitting the D2D discovery signal. In the second scheme, a radio resource individually allocated for each transmission of the D2D discovery signal or a radio resource semi-persistently allocated therefor is used.

In In coverage, the eNB 200 acts as a D2D synchronization source. The eNB 200 transmits an SIB regarding the D2D proximity service. Hereinafter, such an SIB is called an SIB 19. The SIB 19 is a type of system information transmitted by broadcast.

The SIB 19 includes resource pool information indicating a D2D discovery resource pool used for sending a D2D discovery signal in a cell of the eNB 200. The D2D discovery resource pool may individually include a resource pool for transmission and a resource pool for reception. Further, the SIB 19 includes a frequency list indicating a frequency which is another frequency different from a frequency of the cell of the eNB 200, and is available for the D2D discovery procedure. The frequency list is used for the D2D discovery procedure between different frequencies (Inter-frequency Discovery).

Operation According to First Embodiment

Figure 6:
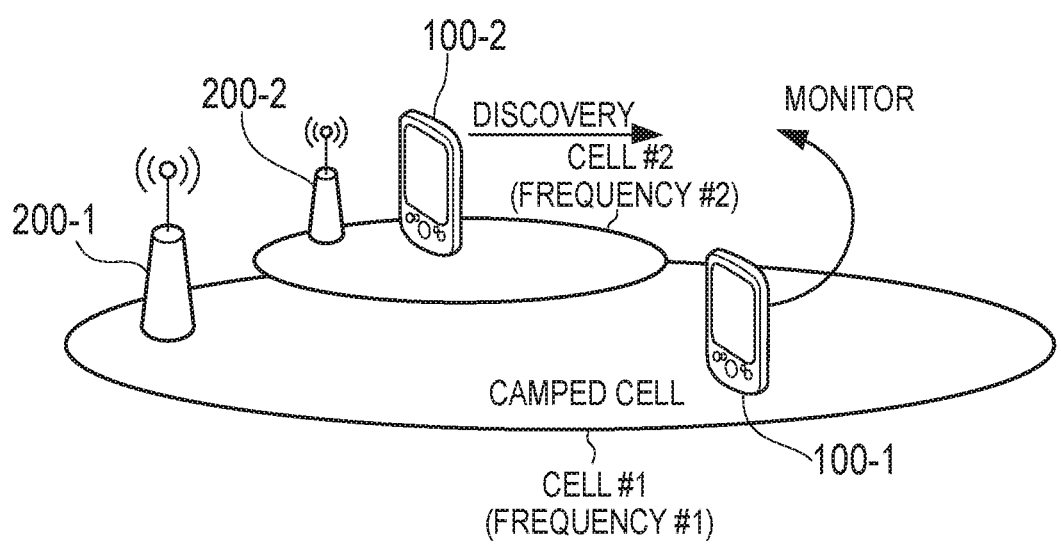
FIG. 6 is a diagram illustrating an operation environment according to the first embodiment.

Hereinafter, an operation according to the first embodiment will be described. FIG. 6 is a diagram illustrating an operation environment according to the first embodiment.

As illustrated in FIG. 6, in a cell #1 of an eNB 200-1, a UE 100-1 in an idle mode exists (camps). In a cell #2 of an eNB 200-2, a UE 100-2 in an idle mode or a connected mode exists. The cell #1 and the cell #2 overlap at least partially.

Further, a frequency #1 to which the cell #1 belongs is different from a frequency #2 to which the cell #2 belongs.

Here, it is assumed that the frequency #1 is a frequency not available for the D2D discovery procedure and the frequency #2 is a frequency available for the D2D discovery procedure. The eNB 200-1 notifies the UE 100-1, by the SIB 19, of the frequency list including the frequency #2.

The UE 100-2 uses a radio resource (D2D radio resource) within the D2D discovery resource pool of the cell #2 to transmit the D2D discovery signal. The UE 100-1 is capable of monitoring the D2D discovery signal transmitted in the frequency #2, in a period during which downlink communication (cellular communication) with the eNB 200-1 is not performed. Such a period is an off period in a discontinuous reception (DRX) or a monitoring gap period allocated from the eNB 200-1.

Thus, in case that the UE 100-1 has an interest in the monitoring (reception) of the D2D discovery signal, it is possible to monitor the D2D discovery signal of the frequency #2 while camping on the cell #1. On the other hand, in case that the UE 100-1 has an interest in a transmission of the D2D discovery signal, it is difficult to transmit the D2D discovery signal of the frequency #2 while camping on the cell #1.

Therefore, in case that the UE 100-1 has an interest in the D2D discovery procedure (in particular, in the transmission of the D2D discovery signal), it is desirable to preferentially select, in the cell selection/reselection, the cell #2 belonging to the frequency #2 available for the D2D discovery procedure. It is noted that when such a selection rule is applied to all the UEs 100 without exception, a large number of UEs 100 may be caused to be concentrated into a specific cell, and thus, it is desirable to enable change of the selection rule depending on a situation.

Figure 7:
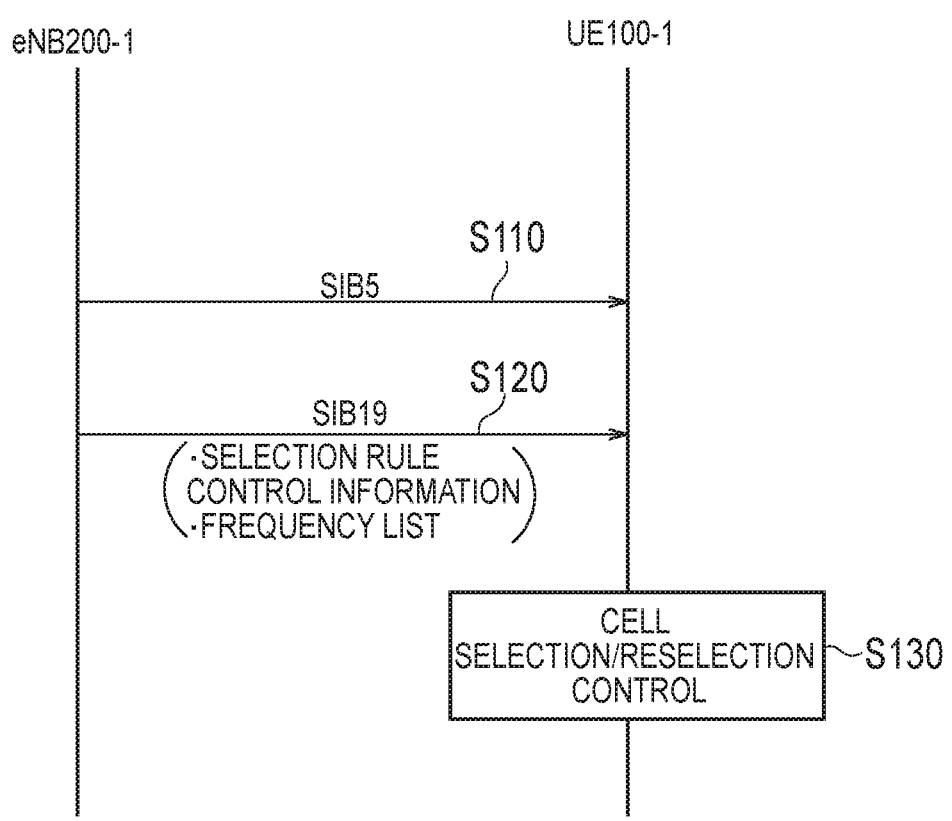
FIG. 7 is a diagram illustrating an operation according to the first embodiment.

FIG. 7 is a diagram illustrating an operation according to the first embodiment. It is assumed that in FIG. 7, the UE 100-1 is in an idle mode.

As illustrated in FIG. 7, in step S110, the eNB 200-1 transmits the SIB 5 including the correspondence relationship between the frequency and the priority. The UE 100-1 receives the SIB 5 from the eNB 200-1.

In step S120, the eNB 200-1 transmits the SIB 19 including a list of frequencies (frequency list) available for the D2D discovery procedure. The UE 100-1 receives the SIB 19 from the eNB 200-1.

In the embodiment, the SIB 19 includes, as a selection rule applied to a cell selection/reselection in the idle mode, configuration information for specifying either one of a first selection rule or a second selection rule (hereinafter, referred to as "selection rule configuration information).

The first selection rule is a selection rule for selecting an appropriate cell irrespective of whether the self UE 100 has an interest in the D2D discovery procedure. In other words, the first selection rule is a general selection rule (in other words, a conventional selection rule).

On the other hand, the second selection rule is a selection rule for preferentially selecting, as the appropriate cell, a cell belonging to a frequency available for the D2D discovery procedure, in case that the self UE 100 has an interest in the D2D discovery procedure.

In the embodiment, each frequency available for the D2D discovery procedure is associated with a priority in the second selection rule in the frequency list. For example, the priority is expressed by the order of the frequencies in the list. Alternatively, the priority information bound to each frequency in the list is added. For example, the second selection rule may be a rule for performing the cell selection/reselection by using not only the priority designated in the SIB 5 but also the priority designated in the SIB 19.

In step S130, the UE 100-1 performs the cell selection/reselection in accordance with the selection rule designated by the selection rule configuration information received from the eNB 200-1. For example, a case is assumed where the UE 100-1 that performs the cell selection/reselection in accordance with the first selection rule receives, from the eNB 200-1, the selection rule configuration information designating the second selection rule. In this case, the UE 100-1 switches from the first selection rule to the second selection rule to perform the cell selection/reselection.

Thus, according to the first embodiment, it is possible to switch the selection rule in the cell selection/reselection, depending on a situation.

It is noted that in the embodiment, the selection rule configuration information is transmitted by broadcast by the SIB 19. However, the selection rule configuration information may be transmitted by unicast by an individual RRC signaling.

Further, in the embodiment, the second selection rule is a selection rule for preferentially selecting, as an appropriate cell, a cell belonging to a frequency available for the D2D discovery procedure, in case that the self UE 100 has an interest in the D2D discovery procedure. However, the second selection rule may be a selection rule for preferentially selecting, as an appropriate cell, a cell belonging to a frequency available for the D2D discovery procedure, in case that the self UE 100 has an interest in the transmission only (or the reception only) of the D2D discovery signal.

Second Embodiment

Next, a second embodiment will be described while particularly focusing on a difference from the first embodiment. A system configuration and a basic operation of the cell selection/reselection according to the second embodiment are similar to those in the first embodiment. In the second embodiment, the D2D communication will be mainly described, out of the D2D proximity service.

(Overview of D2D Communication)

Currently, it is assumed that the D2D communication is performed in In coverage, Out of the coverage, and Partial coverage. Further, it is assumed that in the embodiment, only the preconfigured frequency stored in the UICC 130 is available for the D2D communication.

Further, as the mode of the D2D communication, there are a first mode (Mode 1) in which the eNB 200 (or a relay node) allocates a radio resource for transmitting D2D data (user data and/or a control signal); and a second mode (Mode 2) in which the UE 100 selects the radio resource for transmitting the D2D data from the resource pool. The UE 100 performs the D2D communication in either one of the modes. For example, the UE 100 in the connected mode performs the D2D communication in the first mode, and the out-of-coverage UE 100 performs the D2D communication in the second mode.

Operation According to Second Embodiment

Figure 8:
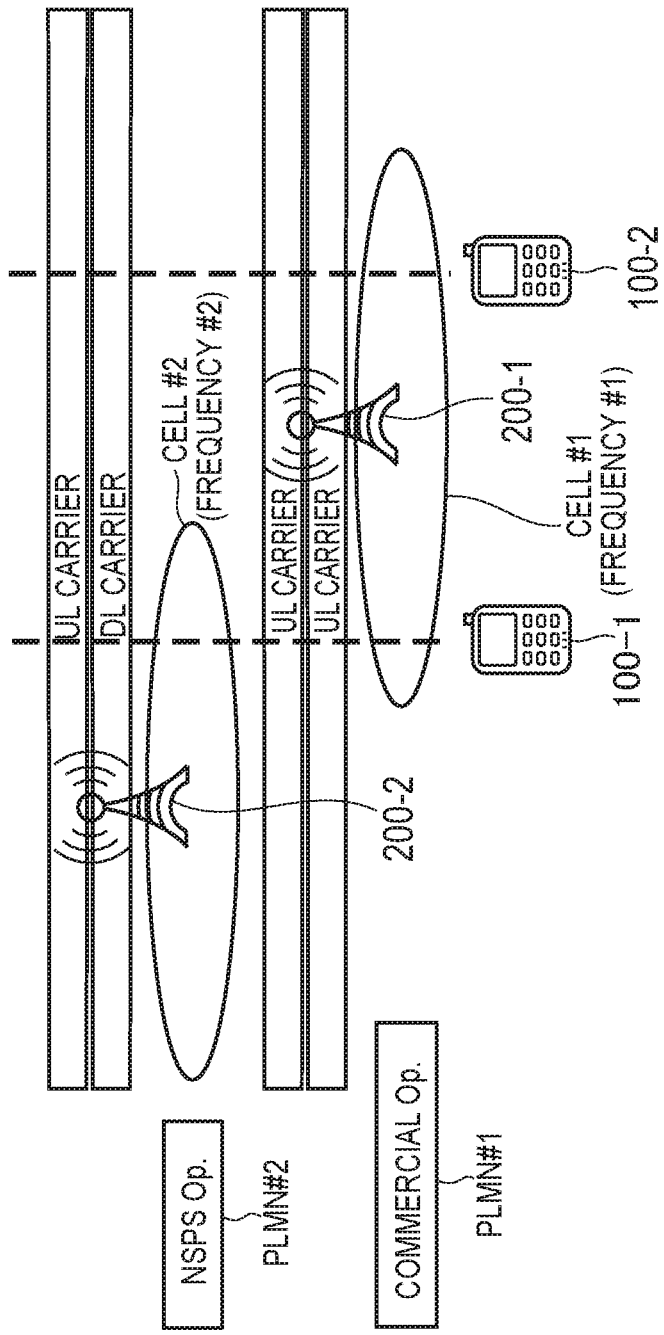
FIG. 8 is a diagram illustrating an operation environment according to the second embodiment.

Hereinafter, an operation according to the second embodiment will be described. FIG. 8 is a diagram illustrating an operation environment according to the second embodiment.

As illustrated in FIG. 8, the cell #2 of the eNB 200-2 at least partially overlaps the cell #1 of the eNB 200-1. In the cell #1 of the eNB 200-1, the UE 100-1 and the UE 100-2 in the idle mode exist (camp). In particular, the UE 100-1 exists in a region overlapping the cell #1 and the cell #2.

Further, a frequency #1 to which the cell #1 belongs is different from a frequency #2 to which the cell #2 belongs. Here, it is assumed that the frequency #1 is a frequency not available for the D2D communication and the frequency #2 is a frequency available for the D2D communication. In the UICC 130 of each of the UE 100-1 and the UE 100-2, the preconfigured frequency #2 is stored.

Further, a PLMN #1 to which the cell #1 belongs and a PLMN #2 to which the cell #2 belongs are different. For example, the PLMN #1 is PLMN of an operator providing a commercial service. On the other hand, the PLMN #2 is PLMN of an operator providing a public safety service. The handling of different PLMNs will be described in a third embodiment.

When it is assumed that the D2D communication is applied to the public safety service, the UE 100-1 having an interest in the D2D communication needs to be capable of performing the D2D communication. Further, when it is assumed that only the preconfigured frequency stored in the UICC 130 is available for the D2D communication, it is desirable to preferentially select, in the cell selection/reselection, only the cell belonging to the preconfigured frequency.

Figure 9:
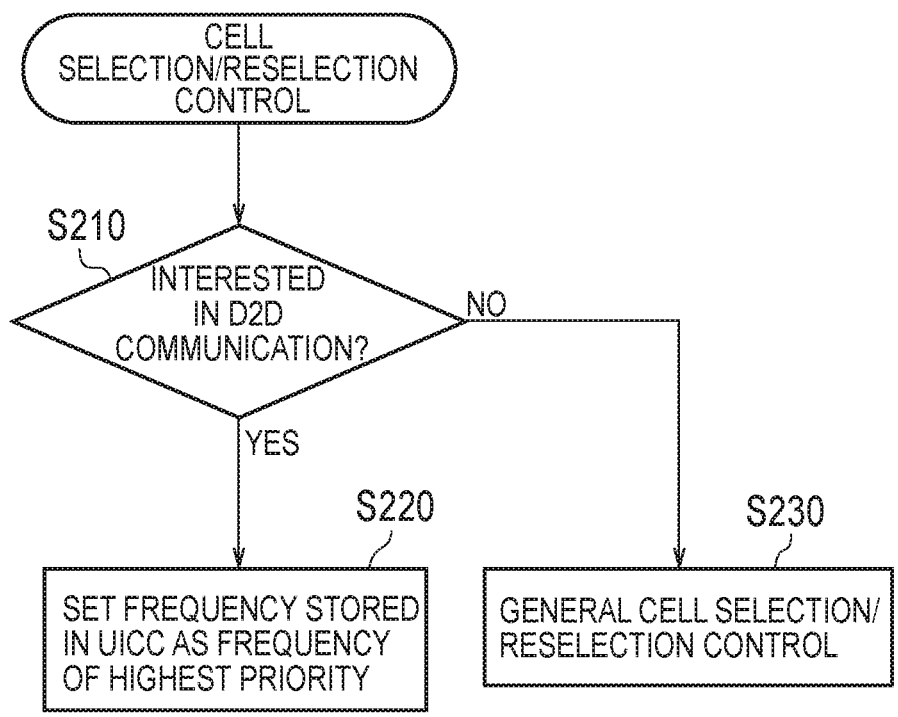
FIG. 9 is a diagram illustrating an operation of a UE according to the second embodiment.

FIG. 9 is a diagram illustrating an operation of the UE 100 according to the second embodiment. It is assumed that in FIG. 9, the UE 100 is in an idle mode.

As illustrated in FIG. 9, in step S210, the UE 100 determines whether or not to have an interest in the D2D communication. For example, the UE 100 determines whether or not a need occurs to utilize the public safety service.

In case of having the interest in the D2D communication (step S210; YES), in step S220, the UE 100 sets, in the cell selection/reselection, the preconfigured frequency stored in the UICC 130 of the UE 100, as the frequency of the highest priority.

On the other hand, in case of not having the interest in the D2D communication (step S210; NO), in step S230, the UE 100 performs the above-described general cell selection/reselection (the conventional cell selection/reselection).

Thus, the UE 100 having the interest in the D2D communication sets, in the cell selection/reselection, the preconfigured frequency stored in the UICC 130 of the UE 100, as the frequency of the highest priority. As a result, it is possible to preferentially select the cell belonging to the preconfigured frequency and to perform the D2D communication in the cell. It is noted that the preconfigured frequency may be provided to the AS entity 100A from an upper entity (the NAS entity 100B, an application layer, and the like). Further, the provided frequency (frequency identifier) may be added with information with an indication of the preconfigured frequency.

However, the UE 100 (UE 100-2 in FIG. 8) located outside any cell belonging to the preconfigured frequency is not capable of selecting, as an appropriate cell, the cell belonging to the preconfigured frequency.

Thus, in case that the self UE 100 has an interest in the D2D communication, the UE 100 preferably selects the preconfigured frequency in order to perform the D2D communication even when the appropriate cell belonging to the frequency preconfigured in the cell selection/reselection has not been discovered. For example, in case of selecting a virtual cell of the frequency #2, the UE 100-2 in FIG. 8 exists in the frequency #2, and when transitioning to outside the frequency #1, the UE 100-2 in FIG. 8 performs the D2D communication in the frequency #2.

Third Embodiment

Next, the third embodiment will be described while particularly focusing on a difference from the first embodiment and the second embodiment. A system configuration and a basic operation of the cell selection/reselection according to the third embodiment are similar to those in the first embodiment. In the third embodiment, a PLMN selection is mainly described.

(Overview of PLMN Selection)

An overview of the PLMN selection will be described, below.

In the PLMN selection, the NAS entity 100B holds a list of PLMNs, and notifies the AS entity 100A of the PLMN selected from the list and requests selection of the cell belonging to the PLMN. Further, when receiving a report of an available PLMN from the AS entity 100A, the NAS entity 100B evaluates the PLMN.

In the PLMN selection, the AS entity 100A acquires a broadcast channel and searches an available PLMN. Further, the AS entity 100A performs various types of measurements for the PLMN selection. The AS entity 100A reports the available PLMN to the NAS entity 100B, in response to the request from the NAS entity 100B or autonomously.

Operation According to Third Embodiment

As illustrated in FIG. 8, it is assumed a case where the cell belonging to the frequency available for the D2D communication belongs to a specific PLMN. The specific PLMN is a PLMN of an operator providing a public safety service, for example Thus, it is necessary to ensure that the UE 100 having an interest in the D2D communication is capable of selecting the specific PLMN.

Figure 10:
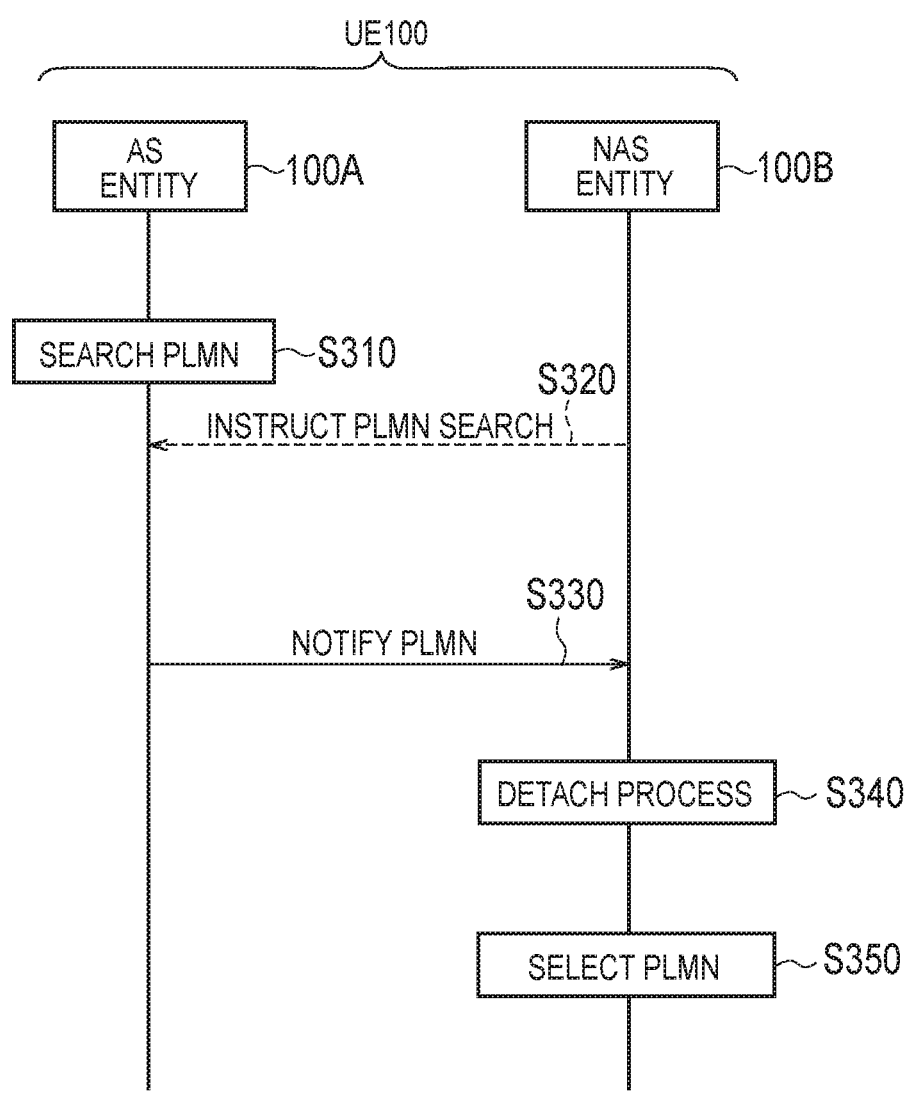
FIG. 10 is a diagram illustrating an operation of a UE according to the third embodiment.

FIG. 10 is a diagram illustrating an operation of the UE 100 according to the third embodiment. The present operation is performed during the initial cell selection after the UE 100 releases the RRC connection to transition to the idle mode to select the frequency available for the D2D communication, for example. An operation for releasing the RRC connection will be described in the fourth embodiment.

As illustrated in FIG. 10, in step S310, the AS entity 100A performs a PLMN search on the preconfigured frequency stored in the UICC 130. It is noted that step S320, which is an optional operation, will be described later.

In step S330, the AS entity 100A notifies the NAS entity 100B of a specific PLMN (PLMN identifier) discovered, through the PLMN search, in the preconfigured frequency.

In step S340, in case that the notified specific PLMN is different from a currently selected PLMN, the NAS entity 100B detaches from the currently selected PLMN. In other words, a process of releasing registration on the currently selected PLMN is performed.

In step S350, the NAS entity 100B selects the notified specific PLMN.

It is noted that when the PLMN search instruction is applied, in step S320, from the NAS entity 100B to the AS entity 100A, the AS entity 100A operates as follows.

The AS entity 100A stores the specific PLMN (PLMN identifier) until receiving the PLMN search instruction from the NAS entity 100B.

Then, the AS entity 100A notifies the NAS entity 100B of the specific PLMN, when receiving the PLMN search instruction from the NAS entity 100B. Specifically, the AS entity 100A notifies, without performing the PLMN search once again, the NAS entity 100B of the specific PLMN, even when receiving the PLMN search instruction from the NAS entity 100B. Further, the AS entity 100A may notify the NAS entity 100B of the specific PLMN as a PLMN having the highest priority.

Fourth Embodiment

Next, the fourth embodiment will be described while particularly focusing on a difference from the first embodiment to the third embodiment. A system configuration and a basic operation of the cell selection/reselection according to the fourth embodiment are similar to those in the first embodiment.

In the fourth embodiment, an operation of releasing the RRC connection in order that the UE 100 in the connected mode performs the operation according to the second embodiment and the third embodiment, will be described. Thus, the fourth embodiment is preferably utilized together with the operations according to the second embodiment and the third embodiment.

Figure 11:
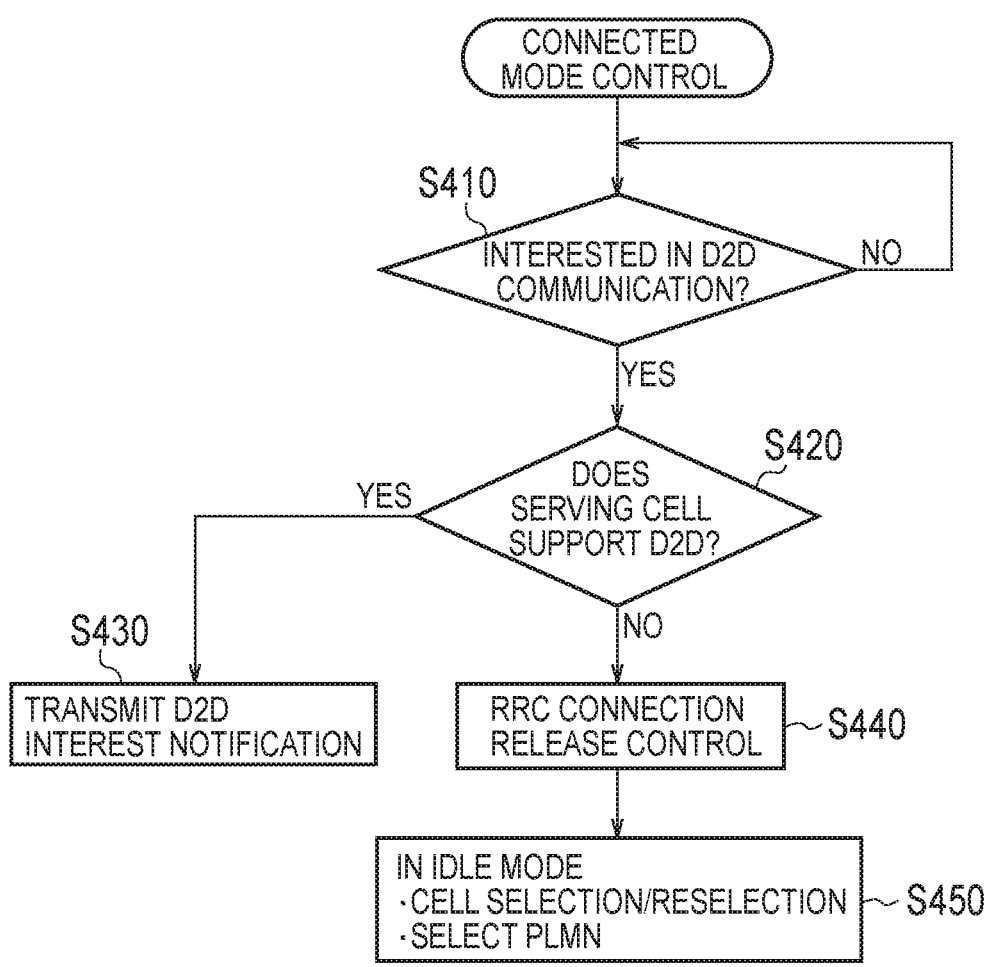
FIG. 11 is a diagram illustrating an operation of a UE according to the fourth embodiment.

FIG. 11 is a diagram illustrating an operation of the UE 100 according to the fourth embodiment. It is assumed that in an initial state of FIG. 11, the UE 100 is in the connected mode. It is further assumed that the serving cell of the UE 100 belongs to the frequency not available for the D2D communication.

As illustrated in FIG. 11, in step S410, the UE 100 determines whether or not the self UE 100 has an interest in the D2D communication.

In case that the self UE 100 has the interest in the D2D communication (step S410; YES), in step S420, the UE 100 determines whether or not the serving cell supports the D2D proximity service. Specifically, the UE 100 determines whether or not the serving cell supports the reception of the D2D interest notification. For example, in case that the serving cell transmits the SIB 19, the UE 100 determines that the serving cell does not support the reception of the D2D interest notification. It is noted that the D2D interest notification may be called D2D indication, ProSe indication, ProSe UE information, and the like.

In case that the serving cell supports the reception of the D2D interest notification (step S420; YES), in step S430, the UE 100 transmits, to the serving cell, the D2D interest notification including the frequency in which the self UE 100 has the interest in the D2D transmission and/or the D2D reception. Alternatively, the D2D interest notification may include a resource request for the D2D transmission. The frequency available for the D2D communication is stored in the UICC 130. The serving cell (eNB 200) that has received such a D2D interest notification hands over the UE 100 to the cell belonging to the frequency available for the D2D communication.

In case that the serving cell does not support the reception of the D2D interest notification (step S420; NO), in step S440, the UE 100 performs control to release the RRC connection with the serving cell.

Specifically, the AS entity 100A releases the RRC connection and notifies the NAS entity 100B of the release of the RRC connection. In this case, a process of releasing the RRC connection is performed by the AS entity 100A.

Alternatively, the AS entity 100A requests, to the NAS entity 100B, the process of releasing the RRC connection. In this case, the process of releasing the RRC connection is performed by the NAS entity 100B.

Such a request may contain, as a cause, information such as "ProSe interest but non-support eNB". The NAS entity 100B may notify the MME 300 of a similar cause. In a case of the cause, the MME 300 requests the eNB 200 to release an S1-MME connection and/or an E-RAB.

In step S450, the UE 100 releases the RRC connection and transitions to the idle mode. The UE 100 that has transitioned to the idle mode performs the operations according to the second embodiment and the third embodiment.

Thus, according to the fourth embodiment, even when the serving cell does not support the reception of the D2D interest notification, if the RRC connection is released, then it is possible to select the cell belonging to the frequency available for the D2D communication.

Fifth Embodiment

Next, a fifth embodiment will be described while particularly focusing on a difference from the first embodiment to the fourth embodiment. A system configuration and a basic operation of the cell selection/reselection according to the fifth embodiment are similar to those in the first embodiment.

In the fifth embodiment, a case is assumed where the UE 100 that supports the D2D proximity service including the D2D discovery procedure and the D2D communication has an interest in both the D2D discovery procedure and the D2D communication in the idle mode.

Figure 12:
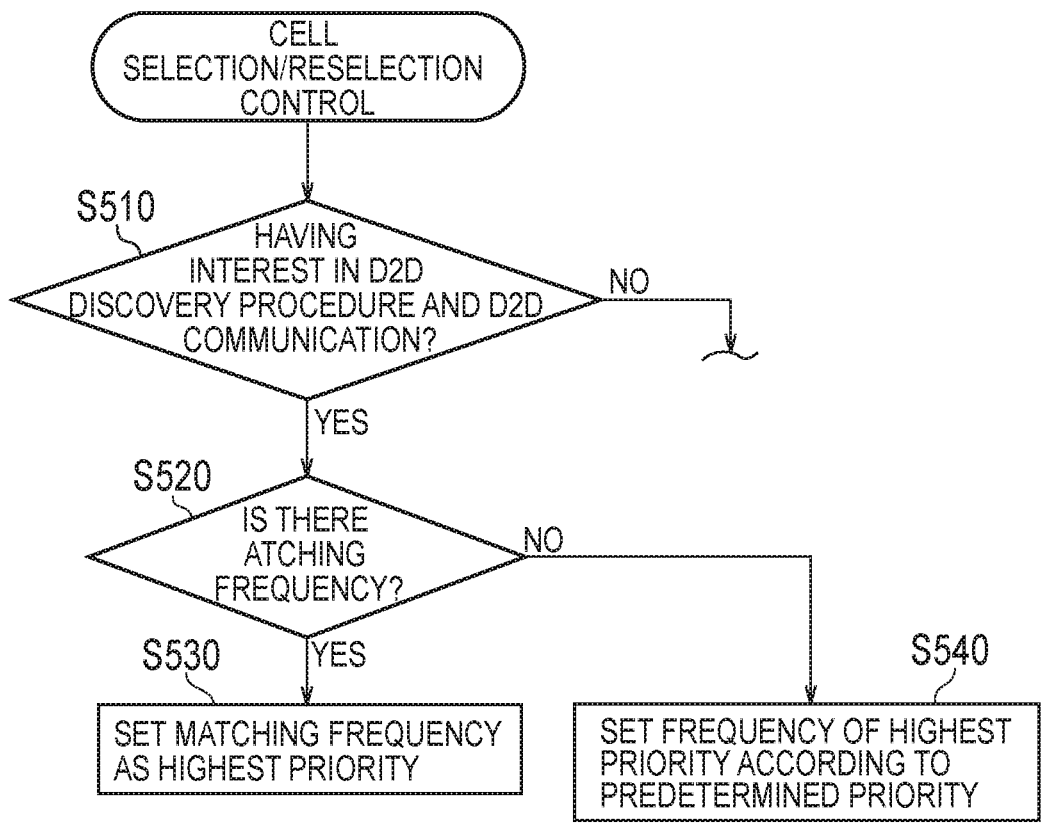
FIG. 12 is a diagram illustrating an operation of a UE according to the fifth embodiment.

FIG. 12 is a diagram illustrating an operation of the UE 100 according to the fifth embodiment. It is assumed that in FIG. 12, the UE 100 is in an idle mode.

As illustrated in FIG. 12, in step S510, the UE 100 determines whether or not to have an interest in the D2D discovery procedure and/or the D2D communication. In case that there are the interest in both the D2D discovery procedure and the D2D communication, the process proceeds to step S520. In case that there is the interest only in the D2D discovery procedure, the UE 100 may perform the operation according to the first embodiment. In case that there is the interest only in the D2D communication, the UE 100 may perform the operation according to the second embodiment and the third embodiment.

In case that there are the interest in both the D2D discovery procedure and the D2D communication, in step S520, the UE 100 determines whether or not there is a frequency available for both the D2D discovery procedure and the D2D communication. For example, it is possible to comprehend the frequency available for the D2D discovery procedure by the frequency list included in the SIB 19. The frequency available for the D2D communication is stored in the UICC 130. The UE 100 compares a plurality of frequencies available for the D2D discovery procedure with the frequency available for the D2D discovery procedure to determine whether or not there is a matching frequency.

In case that there is the matching frequency (step S520; YES), in step S530, the UE 100 sets the matching frequency as the frequency of the highest priority in the cell selection/reselection.

On the other hand, in case that there is no matching frequency (step S520; NO), in step S540, the UE 100 sets, in accordance with the priority order, either one of the frequency available for the D2D discovery procedure or the frequency available for the D2D communication, as the frequency of the highest priority.

Here, the priority order is based on a measurement value (the received power and the reception quality) of the cell-specific reference signal. For example, a frequency having a better (higher in value) measurement value is selected. Alternatively, a frequency having a poorer (lower in value) measurement value is selected. In case that the measurement value is poorer, it is possible to consider being remote from the eNB 200, and thus, it is possible to reduce interference to uplink cellular communication.

Alternatively, the priority order is based on an instruction from the NAS entity 100B to the AS entity 100A. For example, the NAS entity 100B instructs a purpose-specific priority (the D2D discovery procedure is prioritized over the D2D communication, for example) to the AS entity 100A.

Thus, according to the fifth embodiment, it is possible to perform the cell selection/reselection in which both the D2D discovery procedure and the D2D communication are taken into consideration.

Sixth Embodiment

Next, a sixth embodiment will be described while particularly focusing on a difference from the first embodiment to the fifth embodiment. A system configuration and a basic operation of the cell selection/reselection according to the sixth embodiment are similar to those in the first embodiment.

In the sixth embodiment, an operation will be described where in case that there are a plurality of frequencies available for the D2D proximity service, any frequency is prioritized from the plurality of frequencies.

Figure 13:
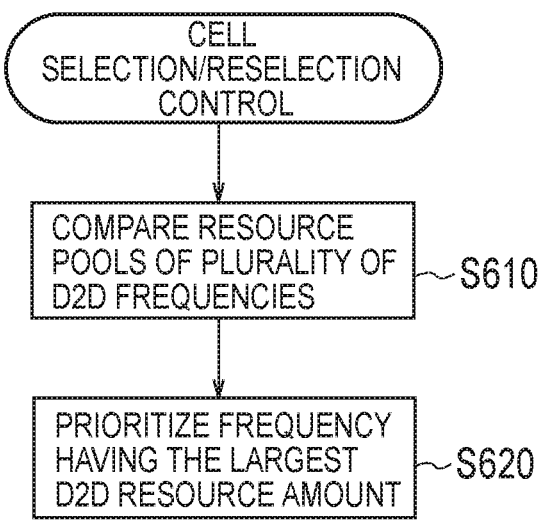
FIG. 13 is a diagram illustrating an operation of a UE according to the sixth embodiment.

FIG. 13 is a diagram illustrating an operation of the UE 100 according to the sixth embodiment. Here, the D2D discovery procedure will be described as an example; however, the D2D discovery procedure may be interchangeably read by the D2D communication. In FIG. 13, it is assumed that the UE 100 is in the idle mode and has an interest in the D2D discovery procedure.

As illustrated in FIG. 13, in step S610, the UE 100 acquires the information on the D2D discovery resource pool, for each of the plurality of frequencies available for the D2D discovery procedure. The D2D discovery resource pool is a time-frequency resource (D2D radio resource) available for the D2D discovery procedure within each frequency. It is possible to comprehend such information by the SIB 19, for example. Then, the UE 100 compares amounts of the D2D discovery resource pool of each frequency available for the D2D discovery procedure. The amount of the D2D discovery resource pool is the number of resource elements configuring the D2D radio resource, within a certain period.

In step S620, the UE 100 selects a frequency having the largest amount of the D2D discovery resource pool, out of the plurality of frequencies available for the D2D discovery procedure. Then, the UE 100 sets the selected frequency as the frequency prioritized in the cell selection/reselection. For example, the UE 100 sets the selected frequency as the frequency of the highest priority.

Thus, according to the sixth embodiment, the UE 100 is capable of performing the cell selection/reselection on the cell belonging to the frequency having the largest amount of the D2D discovery resource pool, and thus, it is possible to improve a success rate of the D2D discovery procedure.

Seventh Embodiment

Next, a seventh embodiment will be described while particularly focusing on a difference from the first embodiment to the sixth embodiment. A system configuration and a basic operation of the cell selection/reselection according to the seventh embodiment are similar to those in the first embodiment.

In the above-described first embodiment to sixth embodiment, a special selection rule in the cell selection/reselection and in the PLMN selection in a case where the UE 100 has the interest in the D2D proximity service (the D2D discovery procedure and the D2D communication) is mainly described. The special selection rule is a selection rule for preferentially selecting, as an appropriate cell, the cell belonging to the frequency available for the D2D proximity service and/or to the PLMN.

Further, in the first embodiment, an operation is described where the eNB 200 specifies either one of the general selection rule (first selection) or the special selection rule (second selection rule) to the UE 100. However, in the first embodiment, whether or not the D2D proximity service is used for a public safety purpose is not particularly discussed. On the other hand, the seventh embodiment is an embodiment with a focus on the D2D proximity service being used for a public safety purpose. However, the D2D proximity service may be used for a commercial purpose.

In the seventh embodiment, the UE 100 that has an interest in the D2D proximity service transmits, to the eNB 200, the D2D interest notification indicating that the self UE 100 has an interest in the D2D proximity service. In case of having the interest in the D2D proximity service for a public safety purpose, the UE 100 may transmit the D2D interest notification to the eNB 200.

The eNB 200 receives the D2D interest notification from the UE 100. The eNB 200 transmits, in response to reception of the D2D interest notification, an RRC connection release notification including configuration information (pS-ProSe), to the UE 100. The configuration information (pS-ProSe) transmitted by the eNB 200 to the UE 100 is information for specifying the second selection rule. The configuration information is included in the RRC connection release notification (an RRC Connection Release message) indicating that the RRC connection between the UE 100 and the eNB 200 is released. For example, an identifier (pS-ProSe) explicitly indicating that the RRC connection release uses the special selection rule (second selection rule) for a public safety purpose is included in a "release Cause" information element included in the RRC connection release notification.

Alternatively, the eNB 200 may perform an RRM measurement configuration on the UE 100, and when the appropriate cell is not measured in the frequency notified by the D2D interest notification as a result thereof, may perform the RRC connection release.

The UE 100 receives, from the eNB 200, the RRC connection release notification including the configuration information (pS-ProSe). The UE 100 releases the RRC connection in response to reception of the configuration information (pS-ProSe) included in the RRC connection release notification, and performs the cell selection/reselection (and/or the PLMN selection) in accordance with the special selection rule (second selection rule) according to the first embodiment to the sixth embodiment.

It is noted that the AS entity 100A (RRC layer) that has received the configuration information (pS-ProSe) notifies the NAS entity 100B of a content of the configuration information. The NAS entity 100B performs, on the basis of the configuration information, the PLMN selection or the reselection for selecting the PLMN available for the D2D proximity service for a public safety purpose. Information (a PLMN ID, a frequency, and the like) on the PLMN available for the D2D proximity service for a public safety purpose is preconfigured to the UICC 130. The NAS entity 100B selects the preconfigured PLMN ID.

The eNB 200 (serving cell) does not necessarily support a PLMN-to-PLMN handover to the frequency available for the D2D proximity service for a public safety purpose (Public safety carrier). Thus, according to the seventh embodiment, in case that the UE 100 by itself performs the special cell selection/reselection (and/or the PLMN selection), it is possible to further ensure a movement to the cell belonging to the frequency available for the D2D proximity service for a public safety purpose.

Eighth Embodiment

Next, an eighth embodiment will be described while particularly focusing on a difference from the first embodiment to the seventh embodiment. A system configuration and a basic operation of the cell selection/reselection according to the eighth embodiment are similar to those in the first embodiment.

In the above-described first embodiment, an example is described where the system information (SIB 19) on the D2D proximity service includes the resource pool information indicating the D2D discovery resource pool used for sending the D2D discovery signal in the self cell (serving cell), and a frequency list indicating another frequency different from the frequency of the self cell, the frequency being available for the D2D discovery procedure.

Here, the system information (SIB 19) on the D2D proximity service may include not only the resource pool information on the D2D discovery procedure and the frequency list but also the resource pool information on the D2D communication and the frequency list.

However, currently, the system information (SIB 19) on the D2D proximity service does not include information indicating as to what frequency is available for what purpose, and thus, it is difficult to comprehend, on the basis of the system information (SIB 19), what frequency is available for what purpose.

Therefore, in the eighth embodiment, the frequency list included in the system information (SIB 19) on the D2D proximity service, includes, in addition to an identifier of the frequency, a purpose identifier associated with the identifier. As a result, it is possible to easily comprehend on the basis of the system information (SIB 19) as to what frequency is available for what purpose.

In the eighth embodiment, the UE 100 receives, from the eNB 200, a list of frequencies available for the D2D proximity service (frequency list). Further, the UE 100 controls, on the basis of the list, the cell selection and/or the cell reselection in the idle mode.

As described above, the D2D proximity service is used for a public safety purpose or a purpose other than the public safety (commercial purpose, for example).

In the eighth embodiment, the frequency list includes a purpose identifier associated with an identifier of the frequency. Further, the identifier of the frequency is an EARFCN (E-UTRA Absolute Radio-Frequency Channel Number), for example. The purpose identifier is an identifier (Public safety ID, for example) for identifying whether or not the frequency is available for a public safety purpose.

In case that the self UE 100 has, in the idle mode, an interest in the D2D proximity service for a public safety purpose, the UE 100 sets, on the basis of the purpose identifier, the frequency available for a public safety purpose, as the frequency of the highest priority. In other words, the UE 100 preferentially selects, in the cell selection/ reselection, the cell belonging to the frequency available for a public safety purpose.

It is possible to determine whether or not the UE 100 has the interest in the D2D proximity service for a public safety purpose, on the basis of the following operation. As described above, the UE 100 comprises the AS entity 100A configured to perform the cell selection and/or the cell reselection, and an upper entity (the NAS entity 100B, the application layer, and the like) located at a layer above the AS entity. The AS entity 100A receives an execution request for the D2D proximity service, from the upper entity. The execution request includes an identifier (a Public safety ID, a Commercial ID, and the like) indicating a purpose of the D2D proximity service that is requested to be executed.

Further, the frequency list further includes a PLMN identifier associated with the identifier of the frequency. The PLMN identifier is an identifier for identifying the PLMN to which the frequency belongs. In case that the self UE 100 has, in the idle mode, an interest in the D2D proximity service for a public safety purpose, the UE 100 preferentially sets, on the basis of the purpose identifier and the PLMN identifier, the PLMN to which the frequency available for a public safety purpose belongs.

Ninth Embodiment

Next, a ninth embodiment will be described while particularly focusing on a difference from the first embodiment to the seventh embodiment. A system configuration and a basic operation of the cell selection/reselection according to the ninth embodiment are similar to those in the first embodiment.

The ninth embodiment shares in common with the eighth embodiment in a feature that it is possible to comprehend on the basis of the system information (SIB 19) as to what frequency is available for what purpose. However, in the ninth embodiment, the frequency list in the system information (SIB 19) does not include the purpose identifier associated with the identifier of the frequency. Instead thereof, in the resource pool information, the corresponding D2D resource pool is associated with the purpose identifier.

In the ninth embodiment, the UE 100 receives the resource pool information transmitted in each of the plurality of frequencies. More particularly, when receiving the system information (SIB 19) of each of the plurality of cells belonging to a different frequency, the UE 100 obtains the resource pool information of each of the plurality of frequencies.

In the ninth embodiment, the resource pool information includes the purpose identifier associated with the D2D resource pool of the corresponding frequency. The purpose identifier is an identifier (Public safety ID and Commercial ID, for example) for identifying whether or not the D2D resource pool is available for a public safety purpose.

The UE 100 determines on the basis of the purpose identifier whether or not each of the plurality of frequencies is available for a public safety purpose. More particularly, in case that the purpose identifier indicating the availability for a public safety purpose is included in the resource pool information of a certain frequency A, the UE 100 determines that the frequency A is available for a public safety purpose. Such a process is performed on each of other frequencies B, C, . . . , to determine the frequency available for a public safety purpose.

A subsequent operation is similar to that in the eighth embodiment. In case that the self UE 100 has, in the idle mode, an interest in the D2D proximity service for a public safety purpose, the UE 100 preferentially selects the cell belonging to the frequency determined to be available for a public safety purpose.

Tenth Embodiment

Next, a tenth embodiment will be described while particularly focusing on a difference from the first embodiment to the ninth embodiment. A system configuration according to the tenth embodiment is the same as that in the first embodiment.

In the first embodiment to the ninth embodiment, a relation between the system information (SIB 19) on the D2D proximity service and information that should be included in the D2D interest notification has not been particularly discussed. In the tenth embodiment, the relation will be described.

In the tenth embodiment, the eNB 200 transmits a list of frequencies available for the D2D proximity service, to the UE 100. The UE 100 receives the list from the eNB 200 (serving cell). The frequency list may be a list of frequencies available for reception (monitoring) in the D2D discovery procedure.

In case that the self UE 100 has the interest in the D2D proximity service in a certain frequency and the certain frequency is not included in the frequency list, the UE 100 notifies the eNB 200 of the certain frequency as the frequency in which the self UE 100 has the interest. More particularly, the UE 100 transmits the identifier of the certain frequency, which is included into the D2D interest notification, to the eNB 200. In other words, the UE 100 notifies, by the D2D interest notification, only the frequency not included in the frequency list, to the eNB 200.

Further, the D2D interest notification may include, in addition to the identifier of the certain frequency, information indicating whether or not the D2D proximity service (reception in the D2D discovery procedure, for example) is prioritized over the communication (reception in the cellular communication) with the eNB 200.

In the tenth embodiment, the eNB 200 receives, from the UE 100, a notification (D2D interest notification) indicating that the UE 100 has an interest in the D2D proximity service in the certain frequency. In case that the certain frequency is not included in the transmitted frequency list, the eNB 200 determines that the UE 100 has the interest in the D2D discovery procedure rather than in the cellular communication, and performs predetermined control on the UE 100.

The predetermined control is control to release the RRC connection between the UE 100 and the self eNB 200. As a result, the UE 100 is capable of performing the cell selection/reselection and the PLMN selection by applying the special selection rule according to the first embodiment to the sixth embodiment. This allows the UE 100 to select the cell belonging to the certain frequency to thereby utilize the D2D proximity service (reception in the D2D discovery procedure, for example) in the certain frequency.

Alternatively, the predetermined control is control to extend a time interval during which the UE 100 should perform the reception from the self eNB 200. More particularly, in case that the UE 100 sets the discontinuous reception (DRX), a configuration value of a DRX cycle is set to be long. As a result, a time interval of an ON period during which the UE 100 receives (monitors) the control signal from the eNB 200 is extended. In other words, an OFF period is extended. Thus, it is possible to monitor the D2D discovery signal in the OFF period, and thus, it is possible to sufficiently secure an opportunity to monitor the D2D discovery signal to improve the success rate of the D2D discovery procedure.

Eleventh Embodiment

Next, an eleventh embodiment will be described while particularly focusing on a difference from the first embodiment to the tenth embodiment. A system configuration according to the eleventh embodiment is similar to that in the first embodiment.

In the first embodiment to the tenth embodiment, a case is mainly assumed where the UE 100 comprises one transmitter unit and one receiver unit only. Further, a carrier aggregation in which one UE 100 performs simultaneous communication with a plurality of cells and dual connectivity in which one UE 100 performs simultaneous communication with a plurality of eNBs 200 have not been discussed.

In the eleventh embodiment, a case is assumed where the UE 100 includes a plurality of transmitter units and/or a plurality of receiver units. In such a case, the UE 100 may utilize the D2D proximity service with some transceivers and utilize the dual connectivity with the remaining transceivers. However, it is agreed that in the 3GPP, the simultaneous use of the D2D proximity service and the dual connectivity is prohibited. Thus, it is desired to realize a framework to prevent the simultaneous use of the D2D proximity service and the dual connectivity.

In the eleventh embodiment the UE 100 includes a plurality of transceivers configured to perform transmission and/or reception of the radio signal, and a controller (processor 160). More particularly, the radio transceiver 110 includes a plurality of transceivers.

The plurality of transceivers include a first transceiver configured to perform communication with the serving cell (cell A), a second transceiver configured to utilize the D2D proximity service under the control of another cell (cell B) different from the serving cell. The cell A and the cell B may belong to a different frequency.

In the UE 100, the first transceiver performs the communication with the serving cell (cell A); however, the remaining transceivers do not perform the communication with another cell (cell X). In other words, the cellular communication is in a single cell communication state. The UE 100 is capable of monitoring, with the first transceiver, the PDCCH of the serving cell (cell A), and at the same time, monitoring, with the second transceiver, the D2D signal transmitted from a UE of another cell. Alternatively, the UE 100 is capable of transmitting, with the first transceiver, an uplink signal to the serving cell (cell A), and at the same time, transmitting, with the second transceiver, a D2D signal transmitted to a UE of another cell.

The UE 100 notifies the serving cell (cell A), via the first transceiver, of information on the another cell (cell B). The information on the another cell (cell B) includes at least one of: a cell identifier of the another cell, a frequency to which the another cell belongs, and the number of the another cell.

In the eleventh embodiment, the eNB 200 manages the serving cell (cell A) of the UE 100 including the plurality of transceivers. The eNB 200 receives, in case that the UE 100 utilizes the D2D proximity service under the control of the another cell (cell B) different from the serving cell, the information on the another cell from the UE 100. The eNB 200 controls, on the basis of the information on the another cell, to not set the another cell as a secondary cell of the UE 100. More particularly, in case that the cell (cell B) corresponding to the cell identifier notified from the UE 100 is a cell of an eNB 200 different from the self eNB 200, the eNB 200 does not set the cell as the secondary cell. Alternatively, in case that the frequency notified from the UE 100 is a frequency different from the operation frequency of the self eNB 200, the eNB 200 does not set the cell belonging to the frequency as the secondary cell. As a result, the eNB 200 is capable of preventing the simultaneous use of the D2D proximity service and the dual connectivity.

Further, the eNB 200 is capable of determining, on the basis of the number of the another cell, in other words, the number of cells that the UE 100 utilizes the D2D proximity service, as to how many more secondary cells are settable.

Alternatively, in order that the UE 100 does not experience overload, it may be possible to control to prevent the simultaneous use of the D2D proximity service and the carrier aggregation. In this case, the eNB 200 does not set, as the secondary cell, the cell (cell B) corresponding to the cell identifier notified from the UE 100. Alternatively, the eNB 200 does not set, as the secondary cell, the cell belonging to the frequency notified from the UE 100.

Other Embodiments

The aforementioned first embodiment to sixth embodiment may be performed separately and independently, and in addition, two or more embodiments may be combined and performed.

In the above-described embodiments, an example is described where an SIB regarding the D2D proximity service is the SIB 19. However, the information on the D2D proximity service may be carried by an SIB (SIB x) other than the SIB 19.

In the described above first embodiment to sixth embodiment, an example is described where the UE 100 comprises one receiver unit and one transmitter unit; however, the UE 100 may comprise a plurality of receiver units and/or a plurality of transmitter units.

Description was given that the operation according to the above-described first embodiment is an operation applied to the D2D discovery procedure in the D2D proximity service. However, the operation according to the above-described first embodiment may be applied to the D2D communication in the D2D proximity service. In this case, the "D2D discovery procedure" in the operation according to the first embodiment may be interchangeably read by the "D2D communication".

Description was given that the operation according to the above-described second embodiment to fourth embodiment is applied to the D2D communication in the D2D proximity service. However, the above-described second embodiment to fourth embodiment may be applied to the D2D discovery procedure in the D2D proximity service. In this case, the "D2D communication" in the operation according to the second embodiment to the fourth embodiment may be interchangeably read by the "D2D discovery procedure".

In each of the above-described embodiments, although the LTE system is described as an example of the mobile communication system, the embodiment is not limited to the LTE system, and the present disclosure may be applied to a system other than the LTE system.

[Additional Remark 1]

1. Introduction

The issues on support of ProSe discovery in multi-carrier were identified and the agreements were reached, however the load balancing aspect has not been discussed yet.

Need to support discovery transmission on carrier other than serving carrier? If not, is there an impact on load balancing (if UEs reselect to a common ProSe carrier) or on battery consumption (if UEs are supposed to monitor beacons on several carriers)?

Agreements 1. aiming to support of Inter-Frequency and Inter-PLMN discovery for monitoring UEs will be introduced. [ . . . ]

3. UEs transmit ProSe discovery signals only on their serving cell (if authorized by the NW).

4. Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps. If the UE has to obtain ProSe discovery (2a) configuration from the SIB of an inter-frequency cell, this does not affect the UE's Uu reception on the serving cell(s). [ . . . ]

With regard to ProSe communication, the multi-carrier operation was also discussed and the outline of procedures was agreed.

Agreements (for ProSe communication) [ . . . ]

2. A CONNECTED UE sends a ProSe indication to its serving cell when it wants perform ProSe communication. The indication contains the intended ProSe frequency.

3. The serving cell may configure an inter-frequency RRM measurement on the ProSe carrier and based on the measurement report trigger inter-frequency mobility to that ProSe carrier once the UE enters coverage on a cell on the ProSe carrier.

4. An IDLE UE may reselect to the ProSe carrier once it detects a suitable cell there. [ . . . ]

6. For Rel-12 we assume that all ProSe communication (for a UE) is performed on a single carrier which is known by pre-configuration to UEs.

This additional remark explains on further details for IDLE UEs to support multi-carrier operation in Rel-12.

2. Working Assumption on IDLE UEs

In the case of MBMS, it is assumed that the UE will camp on the cell which provides an MBMS service of interest as long as the UE only has a single receiver. On the other hand, for discovery monitoring it may not be necessary for the UE to camp on a cell which supports ProSe discovery in accordance of the implication in the agreement 4, i.e. "Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps." This is similar to the case of the existing inter-frequency measurement using CRS.

Confirmation 1: UEs interested in inter-frequency (and inter-PLMN) discovery monitoring is not required to camp on the cell which supports ProSe discovery.

Figure 14:
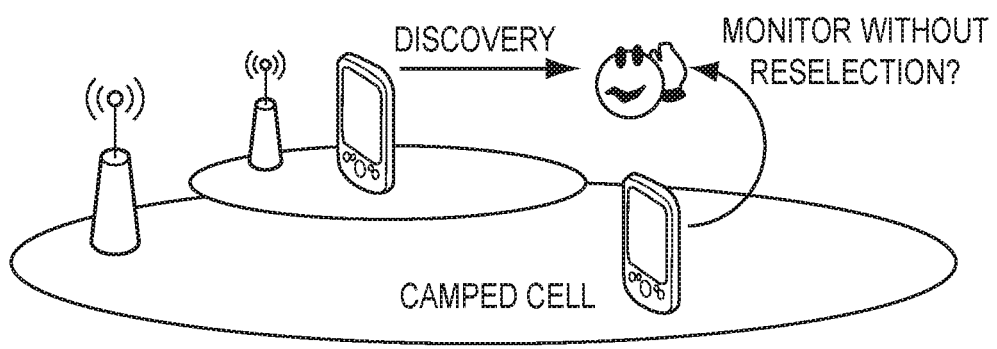
FIG. 14 is a diagram according to an additional remark 1.

FIG. 14 illustrates Discovery monitoring without cell reselection.

With regard to ProSe communication reception, it can be handled with the same assumption as discovery. However, it was agreed that for Rel-12 we assume that all ProSe communication (for a UE) is performed on a single carrier which is known by pre-configuration to UEs. Additionally, for ProSe indication for communication, no distinction was made between transmission and reception in the current agreement. Therefore, in Rel-12, ProSe communication transmission and reception should not be separated, i.e. the UE should tune to a carrier for ProSe communication regardless of whether it's for reception or transmission.

Accordingly, the UE should also camp on the carrier for ProSe communication reception.

Observation 1: For ProSe communication reception, the UE should camp on the cell which supports ProSe communication.

3. Priority Handling During Cell Reselection

For UEs in RRC CONNECTED, the load balancing among inter-frequency cells including non-ProSe-supported cells can be optimized using handovers based on ProSe Indications. However, it isn't clear whether there is any need for modifying the existing reselection procedure and priority to accommodate UE's interested in discovery monitoring or communication. In particular, any changes to the reselection procedure and priority should be carefully considered since the reselection priority is specifically configured for UEs through CellReselectionPriority provided in SIBS or by dedicated signalling for load balancing.

As it is for the case for reselection priorities for MBMS, UEs that are no longer interested in ProSe discovery and communication should follow the existing reselection priority configured by the eNB.

Observation 2: IDLE UEs no longer interested in ProSe discovery or ProSe communication shall follow the existing rules for cell reselection priority.

3.1. Prioritization for ProSe Discovery

It was pointed out, we should further consider whether the UE in IDLE is allowed to prioritize ProSe discovery over the existing cell reselection procedure when the UE is interested in ProSe discovery. If the inter-frequency cell is not synchronized with the serving cell, it should be considered whether the existing DRX occasions is sufficient for discovery monitoring on another frequency. Additionally if it is assumed that UEs interested in ProSe discovery monitoring also tends to be interested in ProSe discovery announcing, it may be preferable that UEs camp on a cell operated on a carrier listed in SIB19 to avoid the need to perform reselection just before announcing. However, in some network deployments if UEs are only interested in discovery monitoring, there seems to be no overriding reason to prioritize the carrier listed in SIB19 during cell reselection. Therefore, the network should have a means to decide whether the prioritization of the ProSe carrier during cell reselection is really needed. One approach would be to allow the eNB to indicate in SIB19 or dedicated signalling whether UEs should apply the existing cell reselection rule or a new rule reselection rule for discovery, wherein the new rule may be an extension of the existing cell reselection, i.e. combination use of CellReselectionPriority in SIBS AND new CellReselectionPriority for discovery in SIB19 or dedicated signalling.

Proposal 1: The eNB should indicate in SIB19 or dedicated signalling whether the UE needs to follow the existing reselection rule or whether the UE is allowed to prioritize ProSe discovery for reselection.

3.2. Prioritization for ProSe Communication

With ProSe communication, the reselection priority for ProSe communication is already decided, since it was agreed that an IDLE UE may reselect to the ProSe carrier once it detects a suitable cell there. Further clarifications provided on priority handling when the UE is interested in ProSe communication and the discussions seem to converge on two options;

Option 1: Additional parameters built on the existing cell reselection criteria, i.e. similar to $Thresh_{X,\ HighP}$, $Thresh_{X,\ LowP}$.

Option 2: By reusing the existing MBMS rules, UEs should be allowed to consider the ProSe communication frequency as the highest priority frequency.

Option 1 would allow the network to control IDLE UEs with high precision, while Option 2 simply allows the UE to prioritize ProSe communication based on UE implementation. Considering on the emphasis on the support for Public Safety in Rel-12, UEs should be allowed to prioritize ProSe Communication over any other services. Therefore, Option 2 is preferable as a baseline.

Proposal 2: UEs should be allowed to prioritize ProSe communication frequency as the highest priority frequency during reselection.

The new rule in Proposal 2 should also be applicable to the pre-configured frequency, i.e. the frequency provided by UICC in the out-of-coverage scenario. This way, reselection priority for ProSe communication can be accounted for in both Public Safety frequency and commercial frequencies in the future.

Proposal 3: When higher layer provides a frequency pre-configured in UICC the UE shall consider that frequency to be the highest priority during performing or interested to perform ProSe communication.

Figure 15:
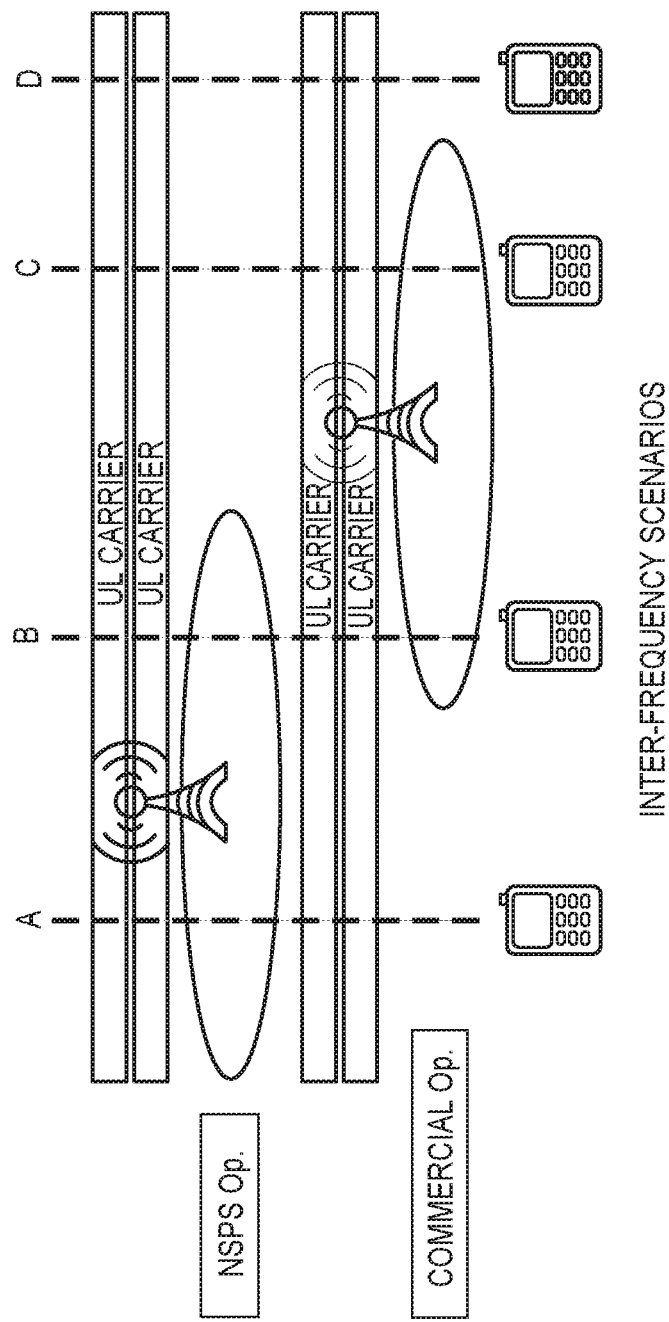
FIG. 15 is a diagram according to the additional remark 1.

In addition to the priority handling during cell reselection, there should be a mechanism for the UE to initiate PLMN selection while the UE is in Connected mode. Since it may not be possible for the serving cell to handover the UE directly to another cell belonging to a different PLMN, it would be necessary the serving cell to release the UE, so that reselection to another PLMN will be possible. This condition is depicted under scenario (B) and scenario (C) and reproduced below as FIG. 15 for convenience. In order to initiate PLMN selection, three alternatives may be considered assuming the UE is released from the serving cell.

ALT 1: The AS reports only the PLMN corresponding to the ProSe carrier to the NAS autonomously, in section 5.1 in TS 36.304.

ALT 2: The AS stores the information corresponding to the ProSe carrier in its memory for optimization of PLMN search and wait the request of PLMN search from the NAS, in section 5.1.2.2 in TS 36.304.

ALT 3: The releaseCause in RRCConnectionRelease is set with newly defined "pS-ProSe" and it's informed to NAS as the release cause which may intend to trigger PLMN selection, in section 5.3.8 in TS 36.331.

ALT 1 is straight-forward and reliable method, but it may need to modify the mature interface to the NAS. ALT 2 is built on current mechanism and may be closed in RAN specification, however be a little bit circular expression. ALT 3 is based on similar concept of the existing CS Fallback mechanism, while it's expected that specification impacts in NAS and the out-of commercial coverage cannot be applicable, i.e. case (A) and (D) in FIG. 15. Considering the WI completion in Rel-12 time frame and assuming the higher layer knows whether the UE is interested in ProSe communication now, we think RAN2 should go with ALT 2.

Proposal 4: the NAS should initiate appropriate action to move the ProSe carrier upon RRC Connection Release for the reason.

3.3. Prioritization Between Discovery and Communication

If Proposals 1 and 2 are acceptable, a conflict of carrier prioritization may occur if the UE is interested in both ProSe discovery and ProSe communication.

If we further consider the scenario that ProSe discovery may be also be used for Public Safety, it is unclear whether ProSe discovery or ProSe communication should be prioritized. In particular, the AS layer alone wouldn't be able to determine which usage should be prioritized, i.e. Public Safety discovery or Public Safety communication. The carrier which the UE camps will allow for both announcing/transmission and monitoring/reception, while the non-serving carrier will be limited to monitoring/reception only. Therefore, the higher layer should provide the necessary information for the prioritization between the ProSe services, i.e. Public Safety discovery and Public Safety communication, if any.

Proposal 5: If the UE is interested in both Public Safety discovery and Public Safety communication the prioritization between these two services should be decided by higher layers.

3.4. Prioritization Between ProSe Services and Other Functionalities

If proposals are acceptable, it should also be considered whether prioritization between ProSe services and the existing functionalities, i.e. CSG and MBMS is needed. If it is acceptable, Public Safety should always be prioritized.

With the same reason, it's natural to prioritize the carrier for Public Safety discovery over the carriers for CSG or MBMS, when the UE is interested in Public Safety discovery. It should be informed by the serving cell which carrier supports Public Safety discovery.

Proposal 6: The carrier for Public Safety discovery should be prioritized over the carriers for CSG or MBMS during the UE is interested in Public Safety discovery and the specific carrier may be informed to the UE by the serving cell.

Then, the remaining issue is the prioritization between commercial discovery, CSG and MBMS. In current specification, the UE shall prioritize the frequency on which the UE camped on suitable CSG cell, while may consider the frequency providing MBMS during MBMS session. We see the existing reselection rule for MBMS may be reused for commercial discovery at least in Rel-12.

Proposal 7: It is up to UE implementation whether the frequency for ProSe discovery should have the highest priority for reselection.

[Additional Remark 2]

1. Introduction

Support of ProSe discovery in multi-carrier operation with the ProSe Indication was agreed.

Agreements 1. aimign to support of Inter-Frequency and Inter-PLMN discovery for monitoring UEs will be introduced. [ . . . ]

3. UEs transmit ProSe discovery signals only on their serving cell (if authorized by the NW).

4. Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps. If the UE has to obtain ProSe discovery (2a) configuration from the SIB of an inter-frequency cell, this does not affect the UE's Uu reception on the serving cell(s).

5. An RRC CONNECTED UE interested (or no longer interested) in intra- or inter frequency ProSe discovery reception indicates this by sending a "ProSe indication" to the eNB (further restrictions to be discussed).

With regard to ProSe communication, the multi-carrier operation was also discussed and the outline of procedures was agreed as follows.

Agreements (for ProSe communication) [ . . . ]

2. A CONNECTED UE sends a ProSe indication to its serving cell when it wants perform ProSe communication. The indication contains the intended ProSe frequency.

3. The serving cell may configure an inter-frequency RRM measurement on the ProSe carrier and based on the measurement report trigger inter-frequency mobility to that ProSe carrier once the UE enters coverage on a cell on the ProSe carrier.

4. An IDLE UE may reselect to the ProSe carrier once it detects a suitable cell there. [ . . . ]

6. For Rel-12 we assume that all ProSe communication (for a UE) is performed on a single carrier which is known by pre-configuration to UEs.

Also, further agreements on how to handle SIB18 (now SIB19) and the ProSe Indication were reached.

1. The eNB indicates with presence of SIB18 whether the UE is allowed to send ProSe indications.

1a. SIB18 provides detailed ProSe discovery configuration for the carrier on which this SIB18 is sent (intra-frequency, inter- and intra-cell).

1b. SIB18 provides a list of additional frequencies (EARFCNs and PLMN ID for inter-PLMN frequencies) on which ProSe discovery announcements are provided. The SIB18 does not contain the detailed ProSe configurations for those.

1c. Both of the Above are Optional in SIB18

Taking the agreements into account, this contribution discusses on handling of multi-carrier ProSe operation.

Figure 16:
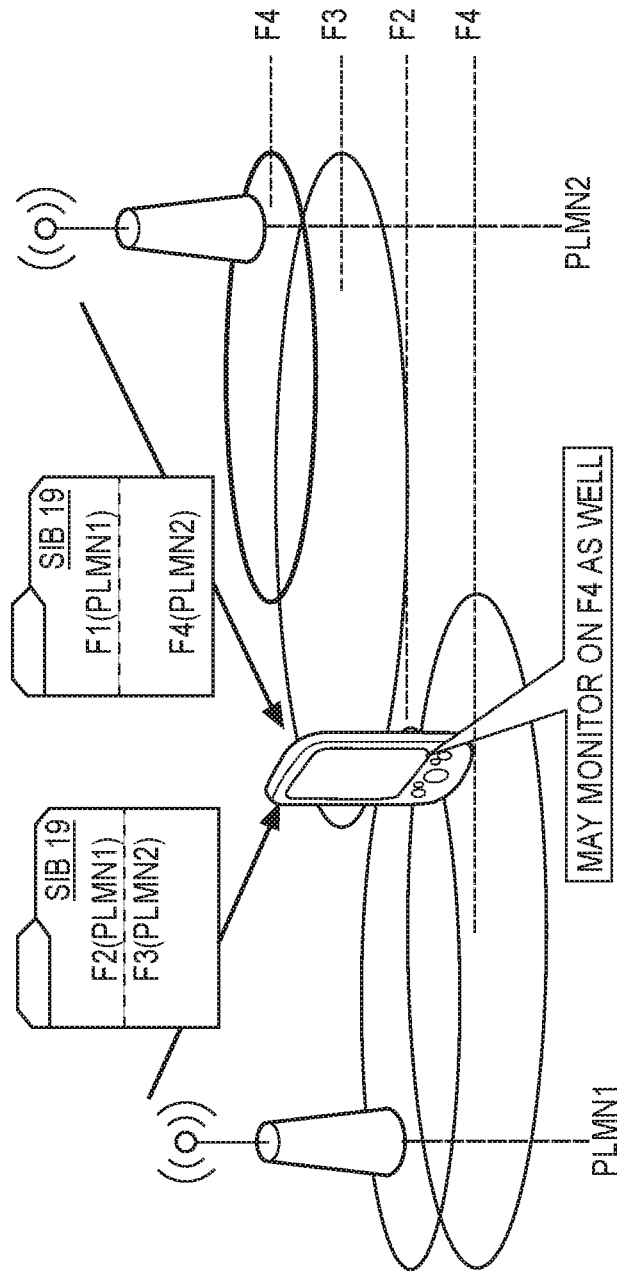
FIG. 16 is a diagram according to an additional remark 2.

2. Discussion 2.1. UE Behaviour Upon Reception of the List of ProSe Discovery Carriers As agreed, an eNB may provide in SIB a list of carriers on which the UE may aim to receive ProSe discovery signals. This agreement implies that the list is either a restriction or an assistant to the UE or both. Our preference is that the list should be considered as assistance information for the monitoring UE to reduce unnecessary power consumption, i.e. the UE may or may not monitor ProSe discovery signals transmitted on the carriers provided in the list. Additionally, if some ProSe carriers provided in SIB19 from a neighbour cell in PLMN2 is not listed in the SIB19 of the serving cell in PLMN1, the UE is allowed to monitor discovery signals transmitted on these ProSe carriers not listed in the serving cell's SIB19, as depicted in FIG. 16. With the above understanding, it would also follow that the UE may further decide to monitor discovery over yet another PLMN (i.e. PLMN 3 not illustrated in FIG. 16) regardless whether any of frequency on this PLMN is listed in SIB19 of the serving cell. As long as the UE has authorization from the higher layer to perform discovery there should be no impact on the Uu reception.

Proposal 1: The UE is not required to monitor discovery based on the ProSe carriers listed on the SIB19 of its serving cell. Furthermore, there should not be any restriction for the UE to monitor other ProSe discovery carriers that are not listed in SIB19 of its serving cell.

2.2. Interaction Between SIB18/19 Presence and ProSe Indication

It was agreed that the eNB indicates with presence of SIB18 whether the UE is allowed to send ProSe indications and Introduce separate SIBs for Communication and Discovery. Then it should be further clarified whether the presence of SIB18 only but not SIB19 is an indication that the UE is allowed to send ProSe Indication for communication. Similar clarification is also needed for the case only SIB19 is provided by the serving cell.

Observation 1: If the serving cell indicates the presences of only SIB18, the UE is allowed to send the ProSe Indications for communication. And if the serving cell indicates the presences of only SIB19, the UE is allowed to send the ProSe Indications for discovery.

Thus far, RAN2 has assumed that only a limited number of carriers supports ProSe discovery. However, this does not mean the other carriers are not ProSe aware. It's just that no discovery resources are provided in certain carriers. These other carriers that do not provide discovery resource may be perfectly capable of handling the ProSe indication for discovery.

Observation 2: Serving cells that do not provide discovery resources may still have the capability to handle ProSe Indication.

For a UE connected to a carrier which does not support discovery, it should also be allowed to send the ProSe Indication to the serving cell in order for the serving cell to handover the UE to a carrier that does provide discovery resources, mainly for the case when the UE is interested in discovery announcing. If the serving cell does not know which carrier supports discovery, it can determine the target carrier according to the frequency of interest indicated in the ProSe Indication. So, the serving cell should broadcast SIB19, as long as the serving cell is capable of supporting ProSe Indication for discovery. This should not be any different for ProSe Indication for communication.

Observation 3: The broadcasting of SIB18/19 by the serving cell should be independent of the serving cell's support for ProSe services and its knowledge of carriers that do supports ProSe services.

Table 1 shows a summary of above discussion. To support the condition in 6, the SIB19 should be broadcasted even if the values of two IEs are null. Correspondingly, Table 2 shows a summary for the SIB18. To avoid dummy configuration in commRxPool-r12, the SIB18 should have commConfig-r12 with null.

Proposal 2: The serving cell may provide SIB18 or SIB19 containing null IEs.

TABLE 1

SIB19 availability and corresponding conditions (referred to agreement)

| | SIB19 available | | | | SIB19 unavailable |
|---|---|---|---|---|---|
| IEs in SIB19 | has only 1a | has only 1b | has 1a and 1b | not have 1a/1b (NULL) | |
| Discovery announcing is allowed on the carrier of serving cell? | Yes | No | Yes | No | No |
| eNB needs to know other carrier? | No | Yes | Yes | No | No |
| ProSe Indication is acceptable? | Yes | Yes | Yes | Yes | No |

Note:

"1a" denotes the detailed ProSe discovery configuration.

"1b" denotes the list of additional frequencies (EARFCNs and PLMN ID).

1a. SIB18 provides detailed ProSe discovery configuration for the carrier on which this SIB18 is sent (intra-frequency, inter- and intra-cell).

1b. SIB18 provides a list of additional frequencies (EARFCNs and PLMN ID for inter-PLMN frequencies) on which ProSe discovery announcements are provided. The SIB18 does not contain the detailed ProSe configurations for those.

1c. Both of the above are optional in SIB18

TABLE 2

SIB18 availability and corresponding conditions

| IEs in SIB18 | SIB18 available | | | | SIB18 unavailable |
|---|---|---|---|---|---|
| | has Config with RxPool | has also General | has also TxPool | not have Config (NULL) | |
| Communication transmission is allowed on the carrier of serving cell? | No | May yes | Yes | No | No |
| ProSe Indication is acceptable? | Yes | Yes | Yes | Yes | No |

"Config" denotes commConfig-r12, "RxPool" denotes commRxPool-r12, cc "General" denotes commGeneralConfig-r12, "TxPool" denotes commTxPoolNormalCommon-r12 and commTxPoolExceptional-r12.

2.3. Dead-Lock Condition Due to Non-ProSe-Aware eNB

Figure 17:
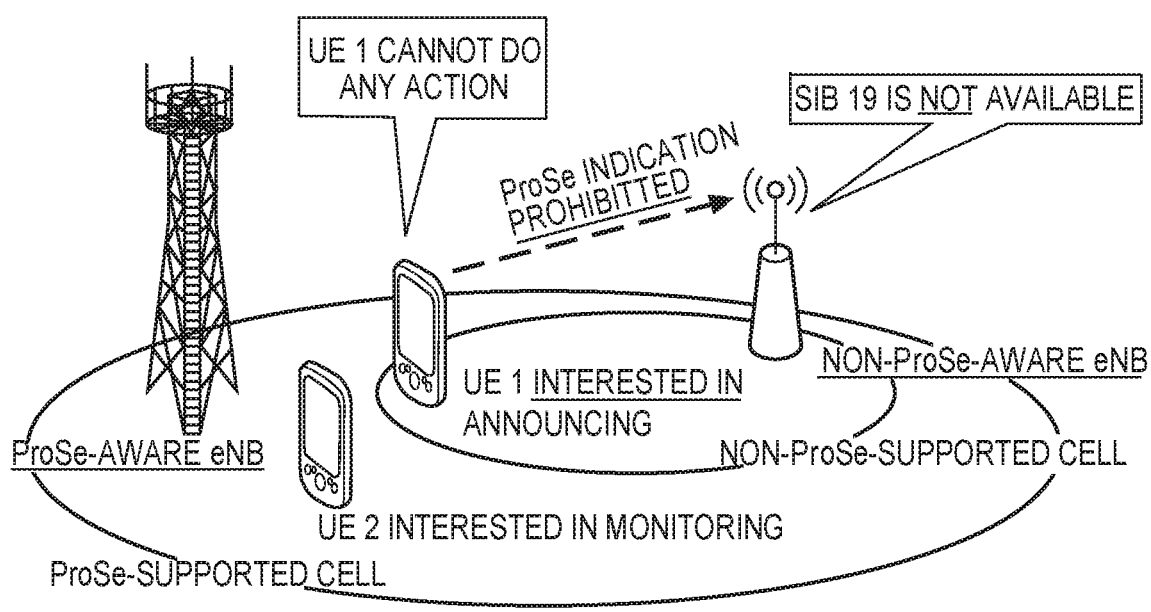
FIG. 17 is a diagram according to the additional remark 2.

In the approved LS, the ProSe Authorized IE in S1-AP and X2-AP is introduced. We assume mixed deployments of ProSe-aware and non-ProSe-aware eNBs in addition to ProSe-supporting and non-ProSe-supporting eNBs are deployed in the same area, wherein we assume the ProSe-aware eNB and the ProSe-supporting eNB indicate the same thing and the non-ProSe-aware eNB and the non-ProSe-supporting eNB also mean the same thing. The non-ProSe-aware eNB may be interpreted as either a legacy eNB which cannot decode the ProSe Indication or Rel-12 eNBs which does not support ProSe Indication. Assuming a ProSe capable UE is in a handover region between two eNBs, one of which is a legacy eNB and the other eNB is a ProSe-aware eNB, the UE may be connected to the legacy eNB or non-ProSe-aware eNB before it becomes interested in ProSe discovery or communication. In this condition as illustrated in FIG. 17, there's no way for the UE to perform the ProSe services of interest even if the UE has been authorized to perform the ProSe services by higher layer, i.e. the ProSe function. Therefore, RAN2 should consider whether such dead-lock condition should be resolved for multi-carrier ProSe operations.

Proposal 3: we should consider if the dead-lock condition needs to be resolved.

If Proposal 3 is agreed, there should be a mechanism to allow the UE to be disconnected from this serving cell using one of the following alternatives.

ALT 1: The UE has a means to inform its serving cell for RRC connection release.

ALT 2: The UE has means to request RRC connection release to higher layer.

ALT 1 is smarter way, however it may need to change legacy specifications if RAN2 assumes legacy eNBs are available in a network. ALT 2 triggers higher layer-initiated connection release, which may have impacts on higher layer specifications. From Rel-12 completion point of view, ALT 1 seems to have minimum impacts on the specifications because the impacts are closed in RAN2.

Proposal 4: If it is necessary to resolve the dead-lock condition, RAN2 should consider if one of the two alternatives should be adopted.

[Additional Remark 3]

1. Introduction

For ProSe UE information, the following agreements for the inter-frequency, inter-PLMN operations, corresponding to SIB18, SIB19 were decided.

Agreements (7.4.2.1 Stage-2 and Stage-3 CP, Inter-Frequency Support and ProSe Interest Indication)

2. A CONNECTED UE sends a ProSe indication to its serving cell when it wants perform ProSe communication. The indication contains the intended ProSe frequency.

Agreements (7.4.3 ProSe Device discovery) [ . . . ]

2. An eNB may provide in SIB a list of (intra-PLMN-inter-frequency and/or inter-PLMN-inter-frequency) carriers (possibly with the corresponding PLMN ID) on which the UE may aim to receive ProSe discovery signals. A cell does not provide detailed ProSe configuration (SIB18) for other carriers. If a UE wants to receive ProSe discovery signals on another carrier, it needs to read SIB18 (and other relevant SIB) from there. [ . . . ]

4. Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps. If the UE has to obtain ProSe discovery (2a) configuration from the SIB of an inter-frequency cell, this does not affect the UE's Uu reception on the serving cell(s).

5. An RRC CONNECTED UE interested (or no longer interested) in intra- or inter frequency ProSe discovery reception indicates this by sending a "ProSe indication" to the eNB (further restrictions to be discussed).

Agreements (7.3.1 General) [ . . . ]

2: b) A connected UE interested to transmit/receive Prose communication shall indicate interest to its serving cell. It shall also inform the network when it is no longer interested to receive/transmit ProSe communication. [ . . . ]

D.2: For discovery monitoring the UE in RRC Connected indicates both intra- and inter-PLMN frequencies in the reception indication.

D.3: For discovery, do not include statement in RRC that idle mode UE performs Prose on carriers of authorised PLMNs. [ . . . ]

Agreements (7.3.2.1.1 Inter-Frequency Support)

R2-144493

1. The combination of ProSe Communication and dual connectivity is not supported in Rel-12

2. A cell on one carrier cannot configure ProSe communication configuration for another frequency, i.e., ProSe configuration is only provided for the PCell.

Case a: the serving cell cannot provide ProSe configuration for a frequency where the UE has no coverage (it uses pre-configuration there).

Case b: the serving cell cannot provide ProSe configuration for another frequency where the UE has coverage (with or without configured SCell). If the UE is not configured with a SCell on the other frequency, the UE may use mode-2 configuration provided in SIB18 of the other cell if that provides the pools and perform ProSe accordingly.

3. For ProSe discovery, the UE may receive ProSe discovery signals on other frequencies, no matter whether there are configure SCells or not. The PCell provides information only for the PCell. Hence UEs have to read SIB18 from the respective neighbour/SCell carriers.

R2-144152

1. The eNB indicates with presence of SIB18 whether the UE is allowed to send ProSe indications.

Agreements (7.3.3.2 Other)

1. The eNB indicates with presence of SIB18 whether the UE is allowed to send ProSe indications.

1a. SIB18 provides detailed ProSe discovery configuration for the carrier on which this SIB18 is sent (intra-frequency, inter- and intra-cell).

1b. SIB18 provides a list of additional frequencies (EARFCNs and PLMN ID for inter-PLMN frequencies) on which ProSe discovery announcements are provided.

1c. Both of the above are optional in SIB18

2. Remove the 1-1-S whether a list of other inter-PLMN ProSe carriers may be provided by higher layers.

However, it is still unclear if there are limitations on what the UE may include in the ProSe UE Information. In particular, the issues relating to the indication of ProSe frequencies of interest and multi-carrier operation are further clarified in this contribution.

2. Discussion 2.1. ProSe Discovery Frequencies of Interest

As mentioned above, RAN2 agreed the serving cell can provide in SIB19 the list of frequencies on which ProSe UE can perform ProSe Direct Discovery. On the other hand, RAN2 also agreed that ProSe UE may indicate the set of frequencies of interest. However, it is FFS whether the set of frequencies indicated should be limited by the discovery frequencies provided in SIB19.

According to the above agreement, ProSe UE can know which frequencies it can aim to receive on. Based on agreement 4, it is already agreed that the UE may perform ProSe discovery reception using a second Rx chain. With the second Rx chain, the UE is not restricted by AS on which frequency it may choose to receive ProSe discovery as long as it is authorized by the higher layer. So from this perspective, it should be already clear that UEs should not be restricted from receiving ProSe discovery on any authorized frequency regardless of whether the frequency is provided in SIB19 of its serving cell.

Observation 1: ProSe UEs should not be restricted from receiving ProSe discovery on any authorized frequency regardless of whether the frequency is provided in SIB19 of its serving cell.

Additionally, in consideration of the inter-PLMN scenarios, it's not too difficult to imagine scenarios whereby UEs needs to monitor discovery from other UEs that may not be one of the serving operator's roaming partner (e.g., vehicle to vehicle discovery). Although the serving cell should not be expected to provide the frequencies of non-roaming partners, the serving cell is also not expected to deny discovery access for such frequencies belonging to other PLMNs. Considering the understanding from Observation 1, the list of frequencies provided in SIB19 should be treated by the UE as informative.

Proposal 1: The list of frequencies provided in SIB19 should be treated by the UE as informative.

Regarding the set of frequencies in ProSe UE Information, the purpose to transmit this set is to inform the serving cell of the frequencies which ProSe UE is interest to monitor. If the ProSe UE is interested in only the serving cell's frequency, ProSe UE should be allowed to indicate the serving cell's frequency which is not listed in SIB19. For inter-PLMN scenario mentioned above, if the ProSe UE is interested in frequencies belonging to other PLMNs, the ProSe UE should be allowed to indicate such frequencies in ProSe UE Information. Therefore, the frequencies included in the ProSe UE Information should not be restricted to the discovery frequencies listed in SIB19.

Proposal 2: The set of frequencies in ProSe UE Information should not be restricted to the discovery frequencies listed in SIB19.

If the above proposals are agreeable, another possibility is that the UE may include frequencies provided in SIB19 and frequencies not provided in SIB19 simultaneously within the ProSe UE Information. Based on the agreements related to ProSe UE Information, it's still unclear how the serving cell would use the indicated frequencies in the ProSe UE Information; however, considering the indicated frequencies may be used to manage the UE's mobility, scheduling etc, so priority should be given to the frequencies provided in SIB19. Therefore, if serving cell simultaneously receives the frequencies provided in SIB19 and frequencies not provided in SIB19 from the ProSe UE, serving cell should ignore the frequencies not provided in SIB19.

Proposal 3: The serving cell should ignore the indicated frequencies not provided in SIB19 if it also received the indicated frequencies provided in SIB19 in the same ProSe UE Information.

2.2. Indication for Multi-Carrier Operation

For ProSe Direct Communication, it's still 1-1-S whether to also support transmission on a non-serving frequency. According to the LS from RAN1, RAN1 already agreed to support WAN transmission and ProSe communication transmission simultaneously. Additionally, based on agreement 2—case b above, it is already clear that ProSe UE may use mode 2 resources to perform ProSe Communication on a cell from a non-serving frequency. However, if the cell were to be configured by the PCell as a SCell, the UE would need to stop ProSe communication on this cell. This may be undesirable for the support of Public Safety. Therefore, if the ProSe UE is allowed to perform ProSe Communication on a non-serving frequency, it should inform the serving cell whether it is using D2D communication in this non-serving frequency, so that the serving cell does not try to configure a cell belonging to this frequency as a SCell.

Proposal 4: If ProSe UE is allowed to perform ProSe Communication on a non-serving frequency, it should inform the serving cell whether it is using D2D communication in this non-serving frequency, so that the serving cell does not try to configure it as a SCell.

The invention claimed is:

1. A user equipment comprising:
a storage; and
a controller containing at least one processor and at least one memory, and configured to control a cell reselection in an idle mode, wherein
the storage stores therein preconfigured information indicating a device to device (D2D) proximity service frequency, and
in case that the user equipment in the idle mode has an interest in a D2D proximity service, the controller is further configured to:
set the D2D proximity service frequency as a frequency of a highest priority in the cell reselection;
perform a search of cells belonging to the D2D proximity service frequency;
determine that the user equipment is out of coverage of the D2D proximity service frequency in response to failing to discover an appropriate cell belonging to the D2D proximity service frequency; and
use the D2D proximity service frequency to perform the D2D proximity service while the user terminal is out of coverage of the D2D proximity service frequency.

2. The user equipment according to claim 1, wherein
in case that the user equipment in a connected mode has an interest in the D2D proximity service, the controller is further configured to transmit a D2D proximity service interest notification to a base station.

3. An apparatus for a user terminal provided with a storage, the apparatus comprising:

at least one processor and at least one memory, the at least one processor configured to control a cell reselection in an idle mode, wherein the storage stores therein preconfigured information indicating a device to device (D2D) proximity service frequency, and in case that the user equipment in the idle mode has an interest in a D2D proximity service, the at least one processor is further configured to:
  set the D2D proximity service frequency as a frequency of a highest priority in the cell reselection;
  perform a search of cells belonging to the D2D proximity service frequency;
  determine that the user equipment is out of coverage of the D2D proximity service frequency in response to failing to discover an appropriate cell belonging to the D2D proximity service frequency; and
  use the D2D proximity service frequency to perform the D2D proximity service while the user terminal is out of coverage of the D2D proximity service frequency.

4. The apparatus according to claim 3, wherein
in case that the user equipment in a connected mode has an interest in the D2D proximity service, the at least one processor is further configured to transmit a D2D proximity service interest notification to a base station.

\* \* \* \* \*